(12) United States Patent
Elbaz et al.

(10) Patent No.: US 11,533,170 B2
(45) Date of Patent: Dec. 20, 2022

(54) HARDWARE MECHANISMS FOR LINK ENCRYPTION

(71) Applicant: Intel Corporation, Santa Clara, CA (US)

(72) Inventors: Reouven Elbaz, Portland, OR (US); Hooi Kar Loo, Penang (MY); Poh Thiam Teoh, Penang (MY); Su Wei Lim, Penang (MY); Patrick D. Maloney, Portland, OR (US); Santosh Ghosh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 16/368,800

(22) Filed: Mar. 28, 2019

(65) Prior Publication Data
US 2019/0229901 A1  Jul. 25, 2019

Related U.S. Application Data

(60) Provisional application No. 62/780,819, filed on Dec. 17, 2018.

(51) Int. Cl.
*H04L 9/08* (2006.01)
*G06F 13/42* (2006.01)
(Continued)

(52) U.S. Cl.
CPC ........ *H04L 9/0827* (2013.01); *G06F 13/4221* (2013.01); *H04L 9/0637* (2013.01);
(Continued)

(58) Field of Classification Search
CPC ..... H04L 9/0827; H04L 9/0637; H04L 9/083; H04L 9/12; H04L 9/14; H04L 2209/122;
(Continued)

(56) References Cited

U.S. PATENT DOCUMENTS 10,162,780 B2 * 12/2018 Choi .................... G06F 13/4022
10,419,481 B1 *  9/2019 Khwaja ................ G06F 13/426
(Continued)

OTHER PUBLICATIONS

Implementation of System Interconnection Devices Using PCI Express , by Ye Ren et al. Published 2015 (Year: 2015).*
(Continued)

*Primary Examiner* — Vu V Tran
(74) *Attorney, Agent, or Firm* — Alliance IP, LLC

(57) ABSTRACT

Methods, systems, and apparatuses associated with hardware mechanisms for link encryption are disclosed. In various embodiments, an interconnect interface is coupled to a processor core to interconnect a peripheral device to the processor core via a link established between the peripheral device and the interconnect interface. The interconnect interface is to select a cryptographic engine of a plurality of cryptographic engines instantiated in the interconnect interface for the link. The cryptographic engine is to symmetrically encrypt data to be transmitted through the link. In more specific embodiments, each of the plurality of cryptographic engines is instantiated for one of a request type on the link, a virtual channel on the link, or a request type within a virtual channel on the link.

23 Claims, 20 Drawing Sheets

(51) Int. Cl.
  H04L 9/06 (2006.01)
  H04L 9/12 (2006.01)
  H04L 9/14 (2006.01)

(52) U.S. Cl.
  CPC ............ H04L 9/083 (2013.01); H04L 9/12 (2013.01); H04L 9/14 (2013.01); *G06F 2213/0024* (2013.01); *G06F 2213/0026* (2013.01); *H04L 2209/122* (2013.01)

(58) Field of Classification Search
  CPC ......... G06F 13/4221; G06F 2213/0024; G06F 2213/0026
  See application file for complete search history.

(56) References Cited

U.S. PATENT DOCUMENTS

| | | | |
|---|---|---|---|
| 10,891,535 B1* | 1/2021 | Mancuso | H04L 63/0428 |
| 2008/0019513 A1* | 1/2008 | Fritz | H04L 65/607 380/46 |
| 2013/0151844 A1* | 6/2013 | Messerschmidt | H04L 9/0827 713/153 |
| 2013/0339591 A1* | 12/2013 | Takahashi | G06F 12/00 711/104 |
| 2016/0119137 A1* | 4/2016 | Sethumadhavan | G06F 12/1408 713/190 |
| 2017/0118180 A1* | 4/2017 | Takahashi | H04L 9/0894 |
| 2018/0183581 A1 | 6/2018 | Elbaz et al. | |
| 2019/0036893 A1* | 1/2019 | Jiang | G06F 13/128 |
| 2020/0162438 A1* | 5/2020 | Hassan | H04L 63/0435 |

OTHER PUBLICATIONS

Granovsky, Ilya et al., "Integrating PCI Express IP in a SoC," IBM, at least as early as Mar. 7, 2019, available online at https://www.design-reuse.com/articles/15545/integrating-pci-express-ip-in-a-soc.html, (6 pages).

Haran, Onn et al., "CTR Mode for Encryption," Jul. 2002, available online at http://grouper.ieee.org/groups/802/3/2fm/public/jul02/p2mp/index.htmlhttp://www.ieee802.org/linksec/meetings/PrevSep02/haran_p2mp_2_0702.pdf, (9 pages).

Jackson, Mike et al., "PCI Express Technology, Comprehensive Guide to Generations 1.x, 2.x and 3.0," copyright 2012, available online at https://www.mindshare.com/files/ebooks/PCI%20Express%20Technology%203.0.pdf (181 pages).

Wikipedia, "BitLocker," available online at https://en.wikipedia.org/wiki/BitLocker, at least as early as Mar. 19, 2019 (6 pages).

Wikipedia, "File Vault," available online at https://en.wikipedia.org/wiki/FileVault, at least as early Mar. 18, 2019 (6 pages).

* cited by examiner

HARDWARE MECHANISMS FOR LINK ENCRYPTION

CROSS-REFERENCE TO RELATED APPLICATION

This application is a nonprovisional patent application and claims the benefit of priority under 35 U.S.C. § 119(e) to U.S. Provisional Patent Application Ser. No. 62/780,819, filed on Dec. 17, 2018, and entitled HARDWARE MECHANISMS FOR LINK ENCRYPTION, the disclosure of which is hereby incorporated by reference in its entirety.

TECHNICAL FIELD

Various embodiments generally may relate to the technical field of computing, and in particular, to hardware mechanisms for link encryption.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Compute devices are often packaged in a way that satisfies protecting from a hardware adversary the secrets and other confidential information they process and manage. When a platform is built with discrete components coming from different providers, secrets that are exchanged could potentially be exposed to an adversary probing/observing the input/output (10) link connecting the two devices. For example, secrets may be exposed on a peripheral component interconnect express (PCIe) link between a Host Central Processing Unit (CPU) and a Solid State Drive (SSD). Computer and peripheral device manufacturers, as well as end users and others can benefit from extending trust boundaries of central processing units (CPUs) and peripheral components to 10 links connecting the devices.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
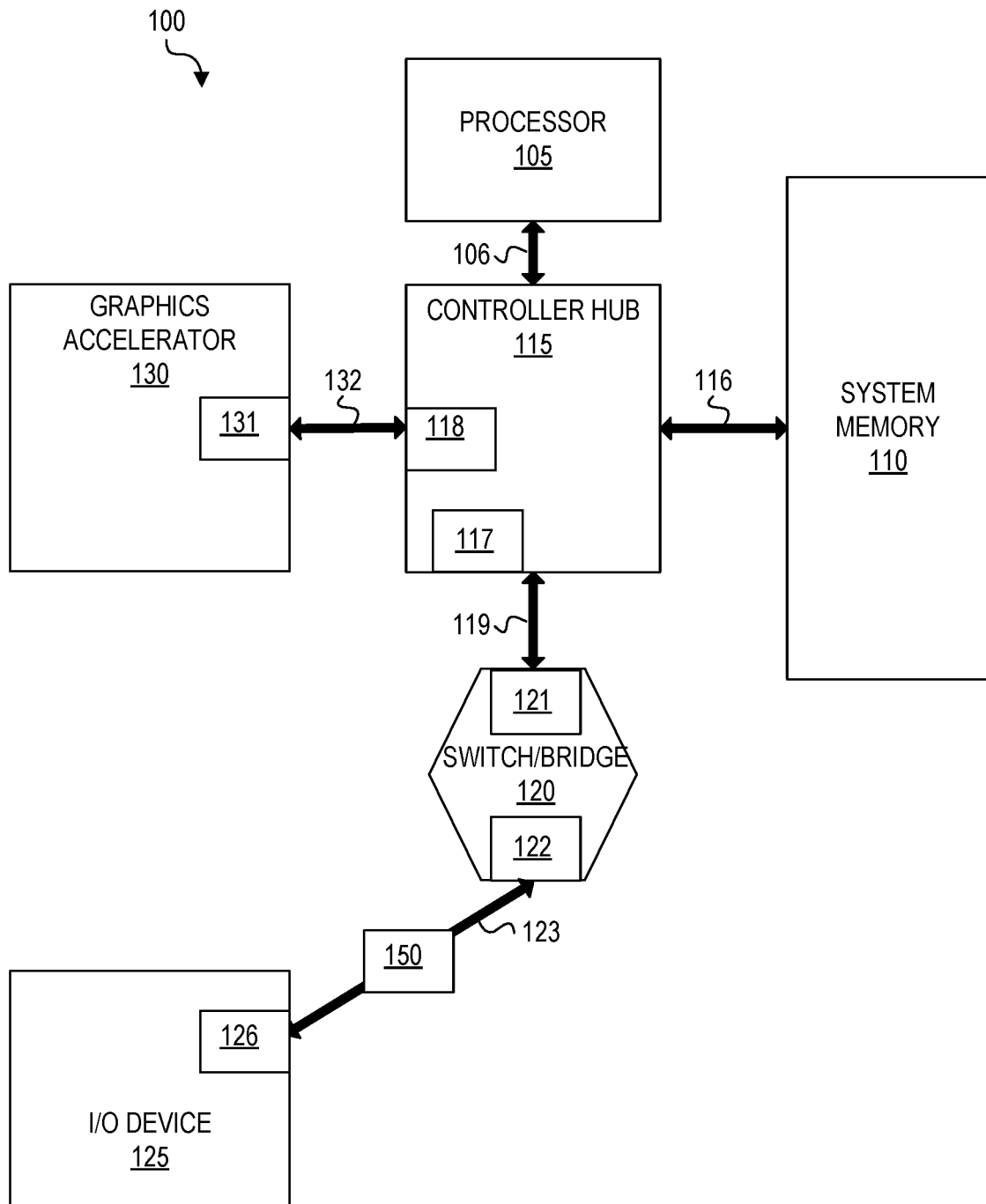
FIG. 1 illustrates an embodiment of a computing system including an interconnect architecture.

The present disclosure provides for hardware mechanisms for link encryption. More specifically, this disclosure describes a system to encrypt data transmitted over an IO link between two discrete devices to extend the trust boundary from individual component packages in a platform to include the link. This description to follow details embodiments in which an encryption scheme is fitted within a typical link protocol stack while offering the advantages of incurring no or negligible impact to the link bandwidth, maintaining confidentiality of data payload transiting on the link, and maintaining link reliability (e.g., preventing the encryption scheme from generating infinite error propagation on the link).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like may be used herein. The phrase generally does not refer to the same embodiments; however, it may. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (at least one A), (at least one B), or (at least one A and at least one B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous, unless the context dictates otherwise.

Embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed but may also have additional steps not included in the figure(s). A process may correspond to a method, a function, a procedure, a subroutine, a subprogram, and the like. When a process corresponds to a function, its termination may correspond to a return of the function to the calling function and/or the main function. Additionally, some or all of the operations in two or more separate flowcharts may be combined into one embodiment.

Embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (IO) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a platform or in a communications network. A computer device may be considered synonymous to, and may hereafter be occasionally referred to, as a computer, computing platform, computing device, etc. The term "computer system" may include any type of interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification or interface standard that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (x1) link, while a graphics adapter typically uses a much wider and faster 16-lane link. It should be noted that a "link" can also refer to communication channels associated with any other type of interface standards connecting high-speed components.

Although the following embodiments may be described with reference to link encryption in integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from link encryption. For example, the disclosed embodiments are not limited to systems-on-chip (SoC). Embodiments may be also used in other devices, such as desktop computer systems, Ultrabooks™, handheld devices, tablets, other thin notebooks, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices but may also relate to software and optimizations for protecting the integrity of component communications. As will become readily apparent in the description below, the embodiments of methods, apparatuses, and systems described herein (whether in reference to hardware, firmware, software, or a combination thereof) are vital to energy efficient computing balanced with security (e.g., integrity and confidentiality) considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which could potentially benefit from aspects of the embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; clients (desktops and mobile), servers (standard, rack scale, and enterprise), and embedded and communication devices. PCI Express is a high performance, general purpose 10 interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power management, quality of service (QoS), hot-plug/hot-swap support, data integrity, and error handling are among some of the advanced features supported by PCI Express.

Referring to FIG. 1, an embodiment of a fabric composed of point-to-point links that interconnect a set of components is illustrated. A system 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller hub 115 is to communicate with 10 devices, in a similar manner as described below. In some embodiments, peer-to-peer routing is optionally supported through a root complex (e.g., 115).

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a solid state drive (SSD), a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, terms such as device, may refer to an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Figure 2:
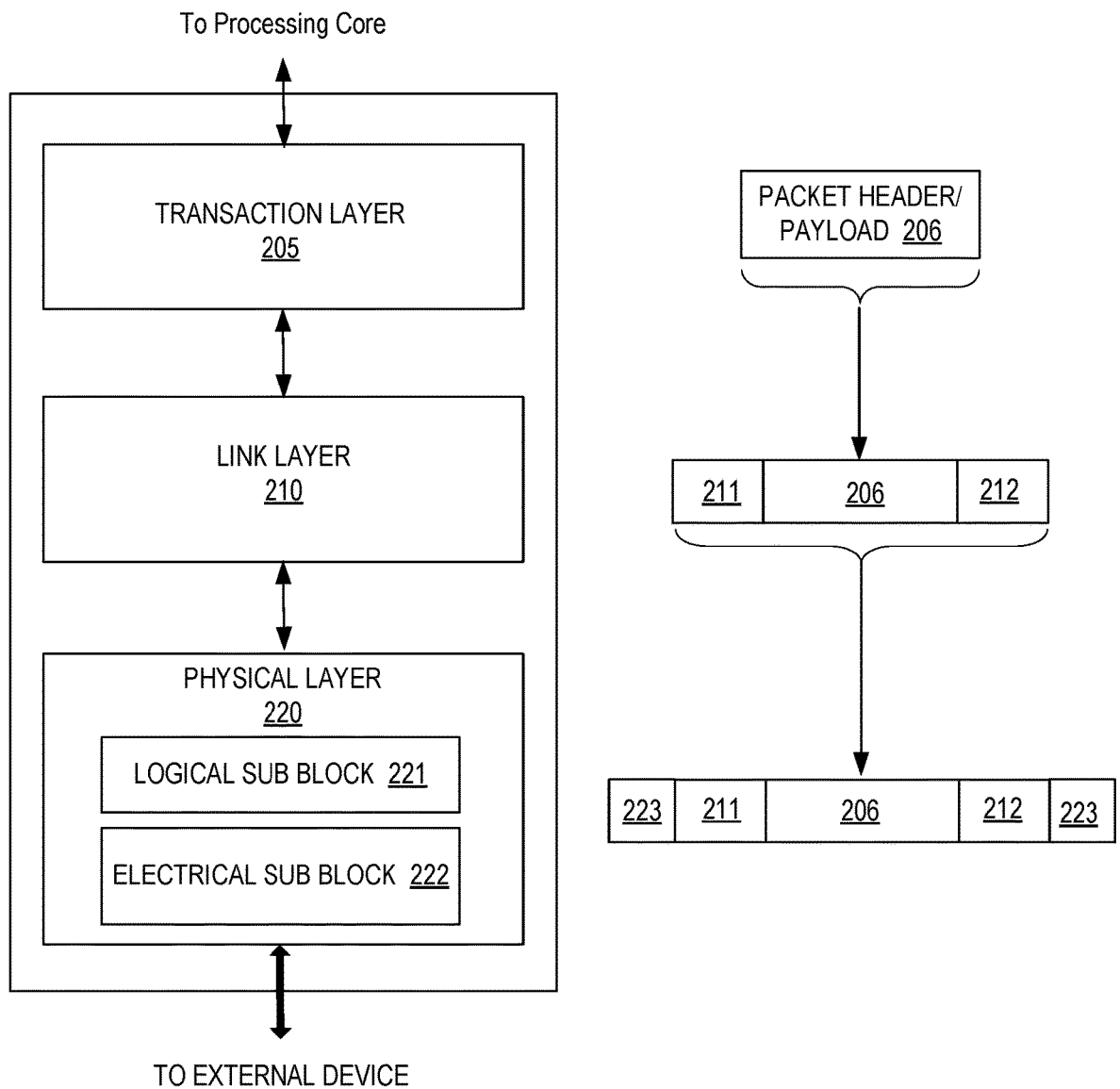
FIG. 2 illustrates an embodiment of an interconnect architecture including a layered stack.
Figure 3:
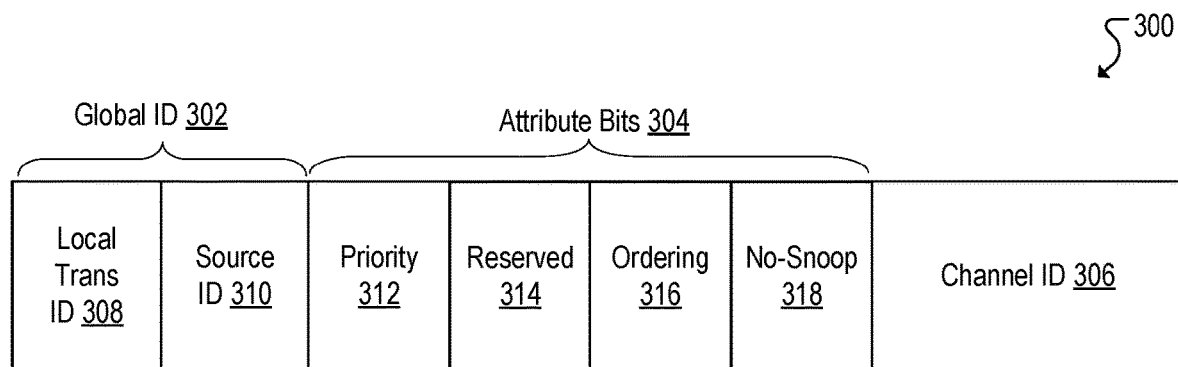
FIG. 3 illustrates an embodiment of a request or packet to be generated or received within an interconnect architecture.
Figure 4:
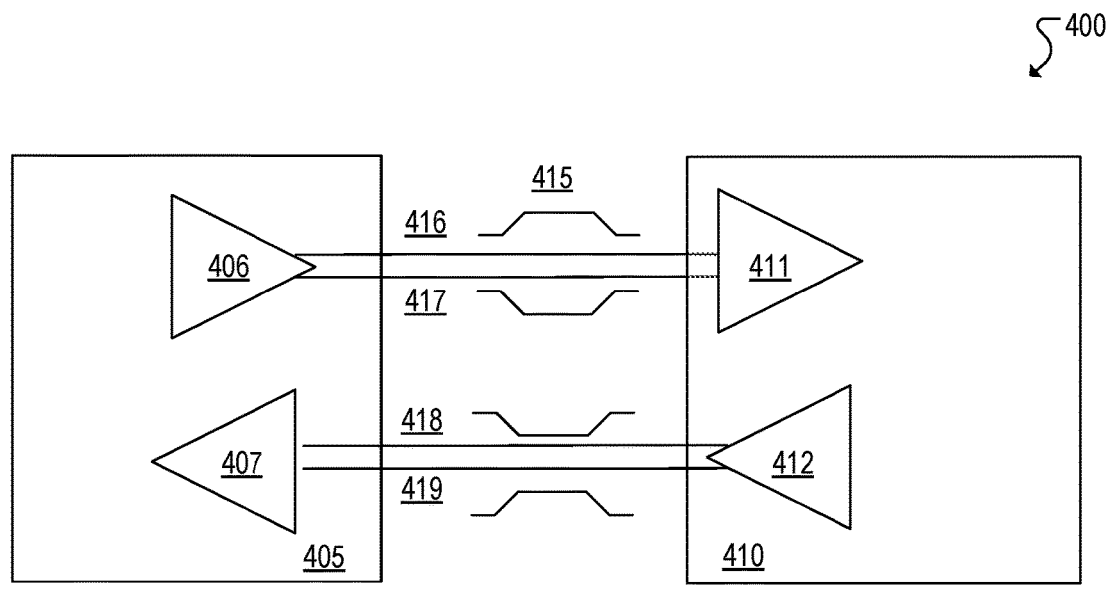
FIG. 4 illustrates an embodiment of a transmitter and receiver pair for an interconnect architecture.

Turning to FIG. 2, an embodiment of a layered protocol stack 200 is illustrated, which may be implemented in one or more components of a mobile computing device, such as an application processor or baseband processor or modem, among other examples. Layered protocol stack 200 includes logic implemented in hardware circuitry, software, and/or firmware to implement any form of a layered communication stack, such as a Quick Path Interconnect (QPI) stack, a PCIe stack, a next generation high performance computing interconnect stack, or other layered stack. Although the discussion immediately below in reference to FIGS. 2-4 are in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

In one embodiment, protocol stack 200 is a PCIe protocol stack including transaction layer 205, link layer 210 (also referred to herein as 'data link layer'), and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 205. An external device at the opposite end of the link, such as controller hub 115 in FIG. 1, counts the number of credits consumed by each TLP. A transaction may be transmitted if the transaction does not exceed a credit limit. Upon receiving a response, an amount of credit is restored. An advantage of a credit scheme is that the latency of credit return does not affect performance, provided that the credit limit is not encountered.

In one embodiment, four transaction address spaces include a memory address space, a configuration address space, a message address space, and an input/output address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with virtual channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global identifier field 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

With reference again to FIG. 2, link layer 210, also referred to as data link layer 210, acts as an intermediate stage between transaction layer 205 and the physical layer 220. In one embodiment, a responsibility of the data link layer 210 is providing a reliable mechanism for exchanging transaction layer packets (TLPs) between two components of a link. One side of the data link layer 210 accepts TLPs assembled by the transaction layer 205, applies packet sequence identifier 211, i.e., an identification number or packet number, calculates and applies an error detection code, i.e., CRC 212, and submits the modified TLPs to the physical layer 220 for transmission across a physical to an external device.

Physical Layer

In one embodiment, physical layer 220 includes logical sub-block 221 and electrical sub-block 222 to physically transmit a packet to an external device. Here, logical sub-block 221 is responsible for the "digital" functions of physical layer 220. In this regard, the logical sub-block includes a transmit section to prepare outgoing information for transmission by electrical sub-block 222, and a receiver section to identify and prepare received information before passing it to the link layer 210.

Physical layer 220 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. In other embodiments, 128b/130b transmission coding is used, among other examples. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

For purposes of illustrating certain example techniques for using hardware mechanisms for link encryption in accordance with embodiments disclosed herein, it is important to understand the activities that may be occurring in systems in which links are utilized to interconnect devices in a platform. Accordingly, the following foundational information may be viewed as a basis from which the present disclosure may be properly explained.

In the context of data at rest protection, two common approaches are often used to address the problem: self-encrypting drives or CPU-based encryption technologies. When the data at rest threat model is extended to attacks on running systems (e.g., remotely accessible multi-user systems), the exposed interconnect needs to be protected to achieve the same security properties. CPU-based encryption addresses the concern at stake as data is encrypted at the source (and hence transit encrypted when leaving the CPU package). Self-encrypting drives on the other hand need extra protection as encryption is done at the destination.

Figure 5:
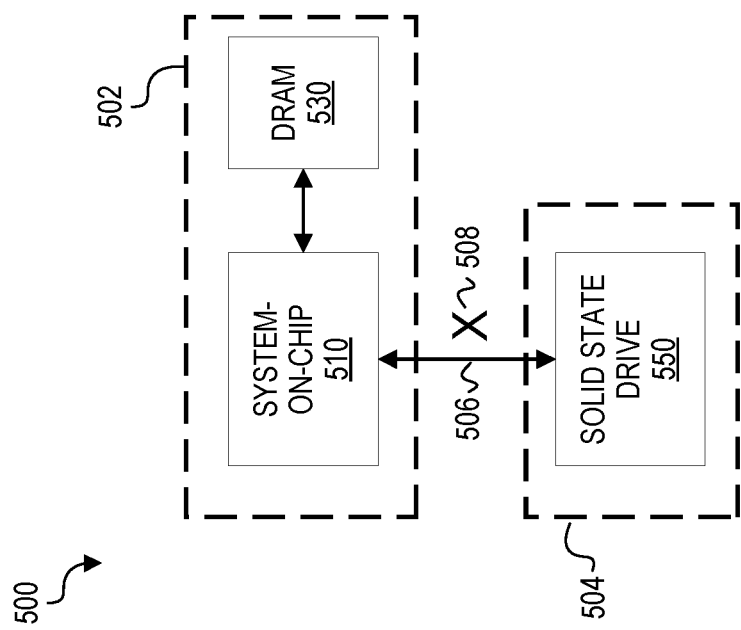
FIG. 5 illustrates an example potential runtime attack on a system with self-encrypting drives.

FIG. 5 illustrates a system 500 with an example threat that needs to be mitigated. A System-On-Chip (SoC) 510 is included in a trust boundary 502. In this example, a dynamic random access memory (DRAM) 530 coupled to SoC 510 is also included in trust boundary 502. In addition, a peripheral device (e.g., self-encrypting solid state drive 550) connected to the SoC 510 via an IO link or bus 506 is included in a separate trust boundary 504. The IO link 506 is not included in the trust boundaries and, therefore, represents an attack vector 508. For this example threat, protection of the link 506 between the CPU package and the drive is needed to protect the confidentiality of data transmitted over the link.

One particular example of this type of threat exists in the cloud market segment, where physical attacks are increasingly prevalent. More generally, any multiuser system accessed remotely may be at risk of an adversary tapping the bus between the SoC and SSD while the system is in use. For example, a malicious user may snoop a link that is exposed on a platform between an SoC and a peripheral device (e.g., an SSD). In yet another example, the threat can include a thief who steals a system. For example, a malicious user could perform an attack on a system in use (e.g., a server in use) or could steal the system (e.g., client system such as a personal computer or hand held device) and perform an attack.

Block cipher encryption is one type of encryption that could provide protection to data sent across a link, such as link 506. However, some block ciphers could potentially introduce between 15 and 50 cycles latency depending on the link operating frequency. Such added latency is not desirable in most platforms. Solutions are needed for protecting the confidentiality of data transmitted between components of a platform while minimizing the impact on performance.

In an improved system implementation, as shown in FIG. 1, cryptographic engines may be implemented to support the protection of links between components or devices (e.g., system-on-chip, peripheral devices, etc.) in a platform. More particularly, embodiments herein provide confidentiality to data transiting on a link that is exposed on a platform between a central processing unit (e.g., of an SoC) and a device such as an SSD component package or other peripheral device in the platform. In one or more embodiments, to protect data communicated on a link between a CPU and a peripheral device, symmetric encryption is applied to the data transiting on the link (e.g., between the SoC and the SSD). One or more embodiments employ counter mode encryption in cryptographic engines, which are provisioned at or above the transaction layer in the protocol stack. Additional features may be included to maintain link ordering requirements without disturbing encryption, to initialize and manage counters to ensure that counter mode encryption security requirements are met, and to detect and recover from fatal link errors due to counters being out of sync because of malformed packets or receiver buffer overflows, for example.

Embodiments described herein offer significant technical improvements in data transmission in a platform for maintaining the confidentiality of the data. Counter mode encryption used in each pair of cryptographic engines connected via a link in a platform can maintain the confidentiality of transiting data while offering the unique advantage of being transparent both in bandwidth and latency, as only an exclusive OR (XOR) gate is added to the data path and an XOR gate can typically be absorbed by the controller cycle time. Thus, embodiments with counter mode encryption incur no or negligible impact to the link bandwidth. Additionally, by detecting and recovering from counters being out of sync, embodiments described herein can maintain link reliability such that the encryption scheme is prevented from generating infinite error propagation on the link.

Figure 6:
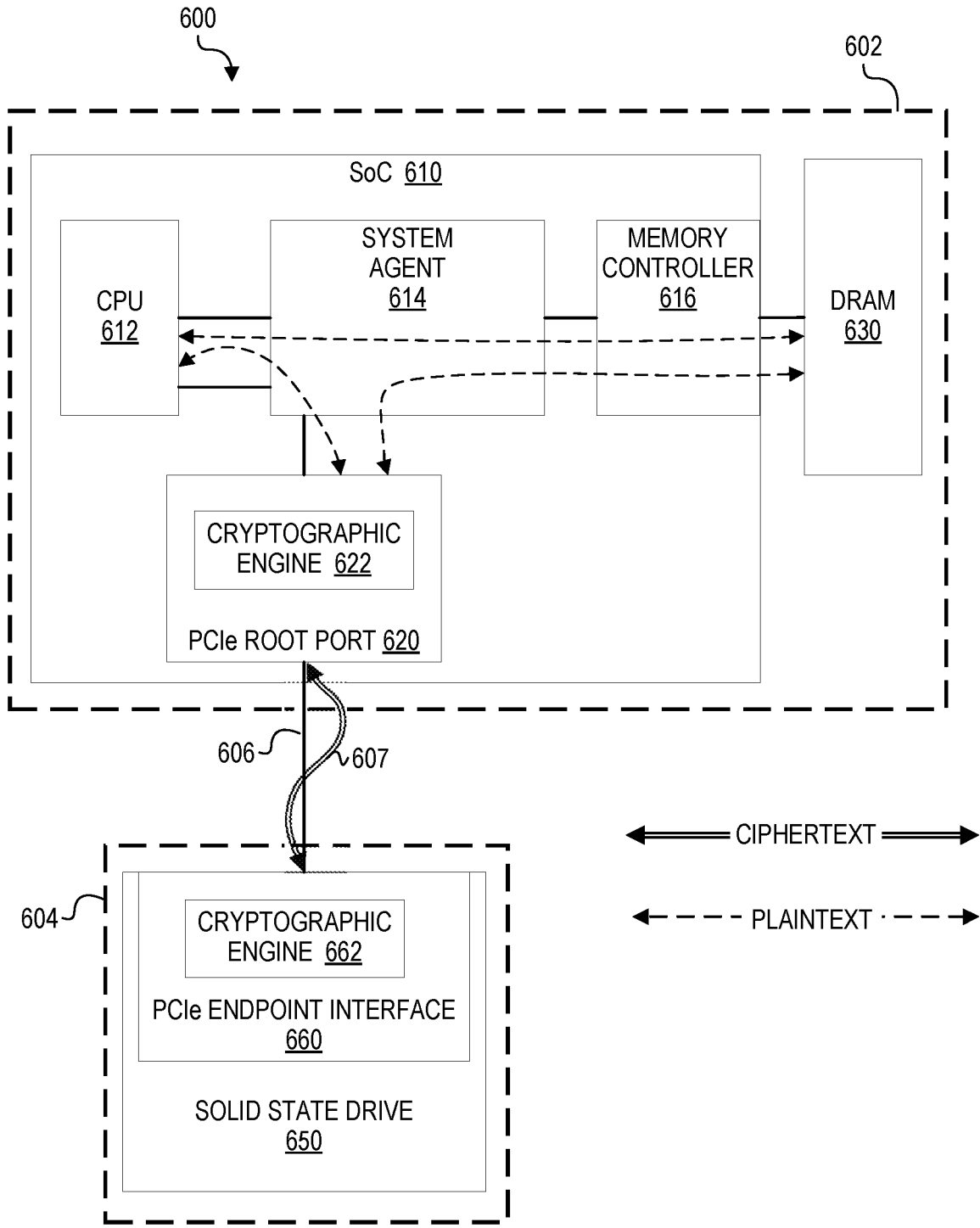
FIG. 6 is a simplified block diagram that illustrates a system with link encryption according to various embodiments.

Turning to FIG. 6, FIG. 6 shows an example system 600 for maintaining the confidentiality of data traversing links between separate components in a platform, such as a host CPU and a peripheral device. Generally, the system includes a system-on-chip (SoC) 610, a dynamic random access memory (DRAM) 630, and a solid state drive (SSD) 650. SoC 610 and DRAM 630 are included within a trust boundary 602, and SSD 650 is included within a separate trust boundary 604. SoC 610 includes a CPU 612, a system agent 614, a memory controller 616, and an interconnect interface, such as peripheral component interconnect express (PCIe) root port 620 (also referred to herein as 'PCIe controller' or 'root complex'). SSD 650 includes a PCIe endpoint interface 660, which connects to PCIe root port 620 via a link 606. A pair of cryptographic engines (CEs) 622 and 662 are connected to opposite ends of link 606. As shown in FIG. 6, CE 622 is provisioned in PCIe root port 620 of SoC 610, and CE 662 is provisioned in PCIe endpoint interface 660 of SSD 650.

PCIe root port 620 may be part of a root complex that is implemented in the SoC 610 for managing communications between CPU 612 and one or more endpoints, such as SSD 650. Endpoints can include any peripheral device (e.g., SSDs, video cards, sound cards, network interface cards, etc.) enabled with an interconnect interface (e.g., PCIe endpoint interface 660) for communication to a corresponding interconnect interface (e.g., PCIe root port, PCIe switch, etc.). CPU 612 can be provisioned in an SoC, such as SoC 610, or any suitable computing system (e.g., desktop, laptop, handheld device, tablet, server, appliance, smart phones, etc.).

Cryptographic engine pairs may be provisioned at opposite ends of a link that connects two PCIe interconnect interfaces, such as link 606 between PCIe root port 620 and PCIe endpoint interface 660. One or more embodiments of link encryption include cryptographic engines in PCIe root port 620 and PCIe endpoint interface 660 encrypting outbound data and decrypting inbound data using symmetric key cryptography. A pair of cryptographic engines (e.g., one CE in the root port and one CE in the endpoint interface) can share a secret key to facilitate the symmetric encryption and decryption. Any number of suitable secure symmetric key sharing techniques may be implemented to enable a secret key exchange that populates the root port and the endpoint interface with a shared secret. At least one possible secret key sharing technique is described in U.S. patent application Ser. No. 15/393,179, entitled Arrangements for Datalink Security, filed on Dec. 28, 2016. In this example, a pairing key may be established for both an SoC and encrypted storage at manufacturing or provisioning of the devices. Subsequently, during operation, the SoC and encrypted storage devices can generate and secretly exchange a session key via a cryptographic exchange based on the pairing key. The SoC and encrypted storage devices can utilize the pairing key and/or session key to send and receive data of the datalink in a secure manner.

Cryptographic engines 622 and 662 can be configured to perform a counter (CTR) mode encryption scheme. Encrypted data, which is also referred to as 'ciphertext' 607, is transmitted over link 606 to PCIe root port 620 when the data originates at SSD 650. Ciphertext 607 is transmitted over link 606 to PCIe endpoint interface 660 when the data originates at SoC 610. When PCIe root port 620 receives ciphertext 607, cryptographic engine 622 can decrypt the ciphertext using the same counter mode encryption scheme. When PCIe endpoint interface 660 receives ciphertext 607, cryptographic engine 662 can decrypt the ciphertext using the same counter mode encryption scheme.

As will be further discussed herein, certain embodiments may utilize multiple pairs of cryptographic engines for a single link. For example, different instances of a cryptographic engine may be instantiated in an interconnect interface for encrypting outbound traffic for a link and decrypting inbound traffic for the link. Also, certain embodiments may utilize a unique symmetric key for each cryptographic engine pair, but other embodiments may use the same symmetric key with different counter values as further described herein.

While system 600 and other examples of the hardware mechanisms for link encryption are shown and described in the context of PCIe links, this has been done for ease of understanding, and it should be apparent that these systems and examples are not so limited. Indeed, the technologies and concepts described herein could be applied to any link and are not necessarily limited to platforms related to PCIe. In addition, PCIe links may be used to connect any number of different types of devices (e.g., peripheral devices, processing elements, endpoints, CPUs, etc.) which may also benefit from the concepts shown and described herein.

In the description to follow, the threat model considered will first be described. The additional challenges posed by using CTR mode encryption and the innovation introduced to make employment of CTR mode encryption possible, will then be described.

Figure 7:
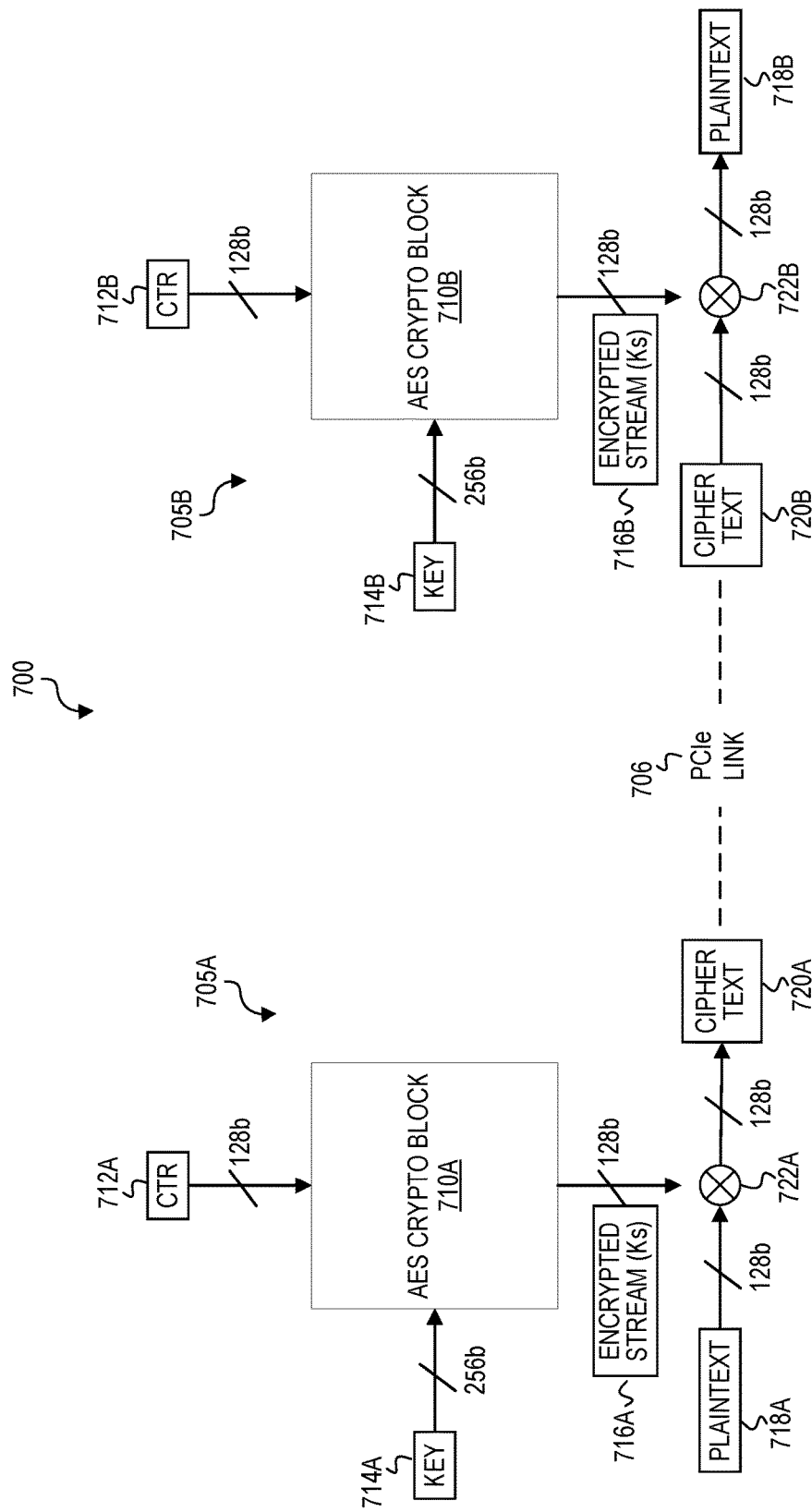
FIG. 7 is a block diagram that illustrates counter mode encryption according to various embodiments.

FIG. 7 is a block diagram illustrating a counter mode encryption scheme 700, in which counter mode encryption 705A is performed by a sending device at one end of a PCIe link 706, and counter mode decryption 705B is performed by a receiving device at the opposite end of the PCIe link 706. The sending device and receiving device can correspond to a pair of cryptographic engines (e.g., 622, 662) disposed at opposite ends of a link (e.g., 606). A cryptographic engine in the sending device can perform encryption for outbound data and a cryptographic engine in the receiving device can perform decryption for inbound data.

Counter mode encryption 705A is used to encrypt data to be transmitted across PCIe link 706. Counter mode encryption 705A can use an Advanced Encryption Standard (AES) crypto block 710A to encrypt a monotonic counter 712A using a key 714A. Key 714A may be a secret symmetric key that has been established between the sending device and the receiving device using any suitable symmetric secret key exchange technique. The encryption by AES crypto block 710A of counter 712A using key 714A produces an encrypted stream 716A (also referred to as 'keystream'). Encryption of the data to be transmitted (or a portion thereof) is achieved by performing an exclusive OR (XOR) operation 722A between encrypted stream 716A and the data to be transmitted (or a portion thereof), which is shown as plaintext 718A. The XOR operation 722A produces ciphertext 720A, which can be sent across PCIe link 706 to a receiving device, which can perform counter mode decryption 705B.

Data decryption by a receiving device using counter mode decryption 705B can be achieved by applying the same encrypted stream to the received ciphertext through an XOR operation 722B. In counter mode decryption 705B, an Advanced Encryption Standard (AES) crypto block 710B performs the same encryption algorithm as AES crypto block 710A. Input to AES crypto block 710B includes a counter 712B and a key 714B, which should have the same values that counter 712A and key 714A had, respectively, during the operations of counter mode encryption 705A to produce the particular ciphertext being decrypted. While the secret key (e.g., 714A, 714B) may be provisioned in cryptographic engines a priori, the counters 712A and 712B must remain in sync for each segment of plaintext that is encrypted into ciphertext, sent over PCIe link 706, and decrypted back into plaintext.

AES crypto block 710B applied to counter 712B using key 714B produces encrypted stream 716B, which should be equivalent to encrypted stream 716A. Data decryption of ciphertext 7206, which represents ciphertext 720A that was sent over PCIe link 706, is achieved by applying encrypted stream 716B to ciphertext 7206 through XOR operation 722B, resulting in plaintext 718B. Applying the same encrypted stream to the ciphertext generated from plaintext 718A, produces plaintext 718B, which should match plaintext 718A by virtue of the XOR operation properties.

For each new stream of plaintext 718A that is fed into counter mode encryption 705A, the counter 712A is incremented such that a different counter is used for each encryption. The counter 712B in the corresponding decryption is also incremented for each new stream of ciphertext 7206 it receives. Thus, counters 712A and 712B are kept in sync in the counter mode encryption 705A at the sending device and counter mode decryption 705B at the receiving device.

While meeting certain desirable goals of link encryption, other challenges can be present when using counter mode encryption for link encryption. These challenges include maintaining link order requirements without disrupting encryption, initializing and managing counters to ensure counter mode encryption security requirements are met, and detecting and recovering from fatal link errors due to counters being out of sync. If the counters do not remain in sync during counter mode encryption, then garbage will be produced when data decryption is performed by a receiving device. One or more embodiments offer novel techniques and hardware mechanisms for addressing these challenges and will now be described in further detail.

Figure 8:
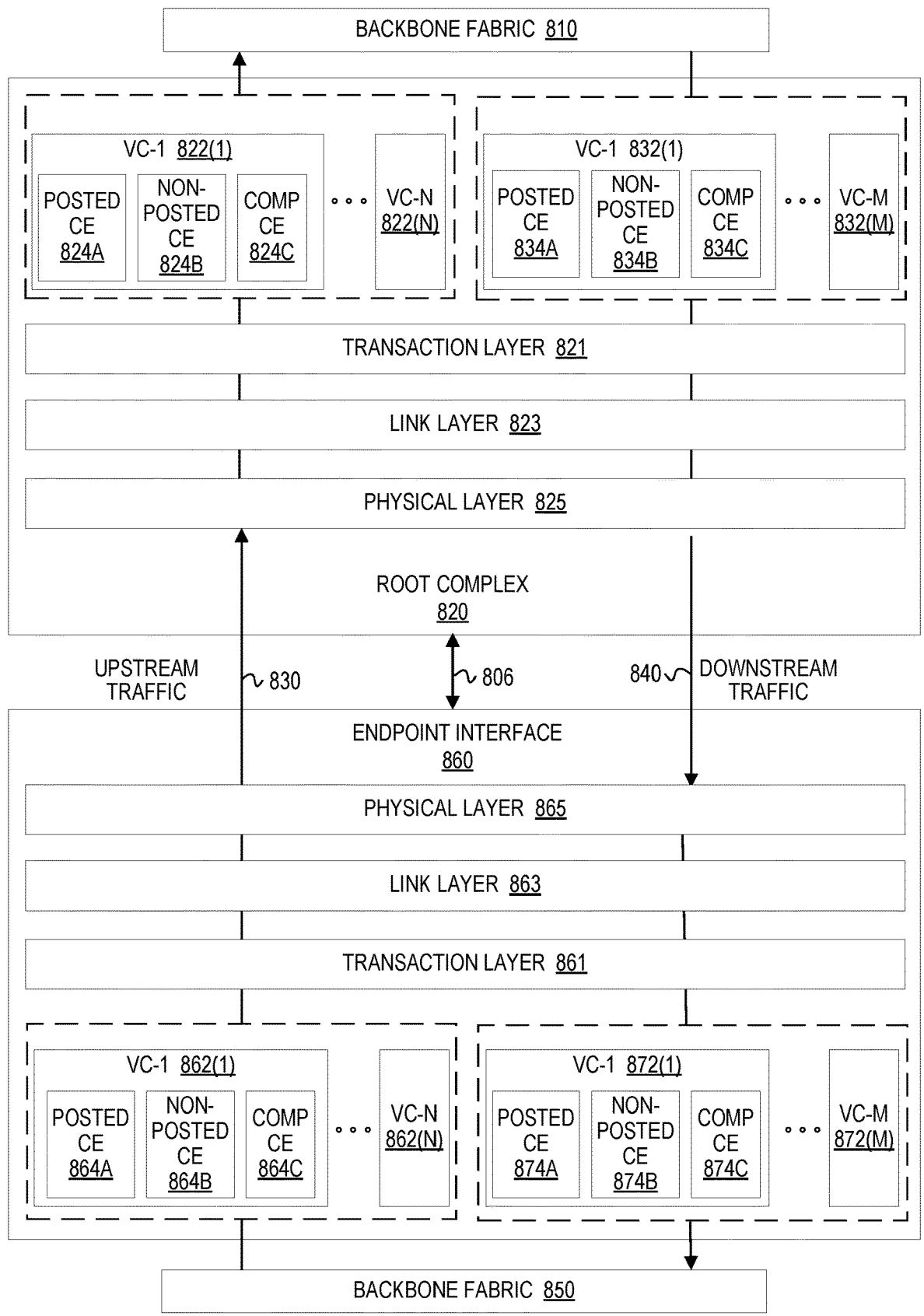
FIG. 8 illustrates possible cryptographic engines in link protocol stacks of connected devices in a system according to various embodiments.

FIG. 8 is a block diagram illustrating example placement of cryptographic engines (CEs) in link protocol stacks of devices to maintain link ordering requirements without disturbing encryption according to various embodiments. In this example, a root complex 820 is connected via a link 806 to an endpoint interface 860. Root complex 820, endpoint interface 860, and link 806 represent possible implementations of PCIe root port 620, PCIe endpoint interface 660, and PCIe link 606, respectively. Root complex 820 can be connected to a backbone fabric 810 (e.g., Soc 610) and include a link protocol stack comprising a physical layer 825, a link layer 823, and a transaction layer 821. Endpoint interface 860 can be connected to backbone fabric 850 (e.g., SSD 650) and include a link protocol stack comprising a physical layer 865, a link layer 863, and a transaction layer 861. In one or more embodiments, cryptographic engines that perform counter mode encryption are provisioned above or at the transaction layers 821 and 861 in the respective protocol stacks of root complex 820 and endpoint interface 860.

Typically, a link may support multiple request types for data that is transmitted from a device at one end of the link to a device at the other end of the link. For example, PCIe includes posted, nonposted, and completion request types. These request types can comprise read requests (e.g., memory, IO, configuration), write requests (e.g., memory, IO, configuration), and messages. Within each of the request types, specific ordering rules are defined to avoid deadlocks and other transmission errors. Thus, in some scenarios, data of certain request types might pass data of other request types in order to make forward progress and not architecturally hang the system. For example, if a first device sends first data of a request type A across a link to a second device, and then subsequently sends second data of a request type B across the link to the second device, then the received first and second data at the second device may be reordered and the second data may be processed through the link layers prior to the first data. For devices having interfaces with cryptographic engines that perform counter mode encryption, if the link allows re-ordering, the counter on the receiving side and the counter on the transmitting side could get out of sync.

One or more embodiments as shown in FIG. 8 can resolve the re-ordering problem. In FIG. 8, a modular approach is shown where a cryptographic engine (CE) is instantiated per virtual channel (VC) and per-request type. In PCIe, virtual channels are defined by PCIe Express Base Specification Revision 3.0, PCI-SIG, Nov. 10, 2010, for differential bandwidth allocation. Transactions (e.g., packets of data) may be associated with a VC according to their traffic class (TC) attribute. A TC-to-VC mapping in a configuration block of a device specifies which traffic class is associated with which VC. Virtual channels can be used to permit transactions having a higher priority to be mapped to a separate VC to avoid resource conflicts with lower priority transactions. Transactions of each request type may be associated with a virtual channel, and ordering of transactions is maintained per virtual channel. Thus, a high priority TC may include transactions that are posted, nonposted, and/or completion request types, and a lower priority TC may also include transactions that are posted, nonposted, and/or completion request types.

As shown in FIG. 8, in at least one embodiment, corresponding virtual channels may be allocated for upstream traffic 830 that flows from endpoint interface 860 to root complex 820 and for downstream traffic 840 that flows from root complex 820 to endpoint interface 860. For example, upstream virtual channels in root complex 820 include VC-1 822(1) through VC-N 822(N), while corresponding upstream virtual channels in endpoint interface 860 include VC-1 862(1) through VC-N 862(N). Downstream virtual channels in root complex 820 include VC-1 832(1) through VC-N 832(M), while corresponding downstream virtual channels include VC-1 872(1) through VC-N 872(M).

In one or more embodiments, a cryptographic engine for each request type (e.g., posted, nonposted, and/or completion) is instantiated in the root complex. For example, posted CE 824A, nonposted CE 824B, and completion CE 824C may be instantiated in the root complex and associated with VC-1 822(1) for upstream traffic, and posted CE 834A, nonposted CE 834B, and completion CE 834C may be instantiated in the root complex and associated with VC-1 832(1) for downstream traffic. CEs may also be instantiated in the root complex and associated with the other VCs and request types allocated for upstream and downstream traffic but are omitted for in the drawing for ease of illustration.

A cryptographic engine for each request type (e.g., posted, nonposted, and/or completion) is also instantiated in the endpoint interface to correspond to a CE in the root complex. For example, posted CE 864A, nonposted CE 864B, and completion CE 864C may be instantiated in the endpoint interface and associated with VC-1 862(1) for upstream traffic. Posted CE 864A, nonposted CE 864B, and completion CE 864C are paired, respectively, to posted CE 824A, nonposted CE 824B, and completion CE 824C associated with VC-1 822(1) of the root complex. Similarly, posted CE 874A, nonposted CE 874B, and completion CE 874C may be instantiated in the endpoint interface and associated with VC-1 872(1) for downstream traffic. Posted CE 874A, nonposted CE 874B, and completion CE 874C are paired, respectively, to posted CE 834A, nonposted CE 834B, and completion CE 834C associated with VC-1 832(1) of the root complex. CEs may also be instantiated in the endpoint interface and associated with the other VCs and request types allocated for upstream and downstream traffic but are omitted for in the drawing for ease of illustration.

It should be noted that not all devices may utilize every request type. In some scenarios, for example, an endpoint may only utilize one request type. In this scenario, a single CE may be instantiated per VC for the device. In other scenarios, virtual channels may not be utilized by a device. In this scenario, the CEs may be instantiated per each request type, without being associated to a virtual channel.

Since ordering is maintained per VC and per request type, each CE maintains its own counter. Counters for a pair of CEs, however, remain in sync to perform counter mode encryption and decryption of data transmitted over a link between the pair of CEs. In addition to maintaining link ordering requirements without disrupting the counter mode encryption scheme, another advantage of this approach is that when only a specific VC or request type needs to be protected, the cost related to encryption can be scaled accordingly by instantiating only the corresponding CE.

Figure 9:
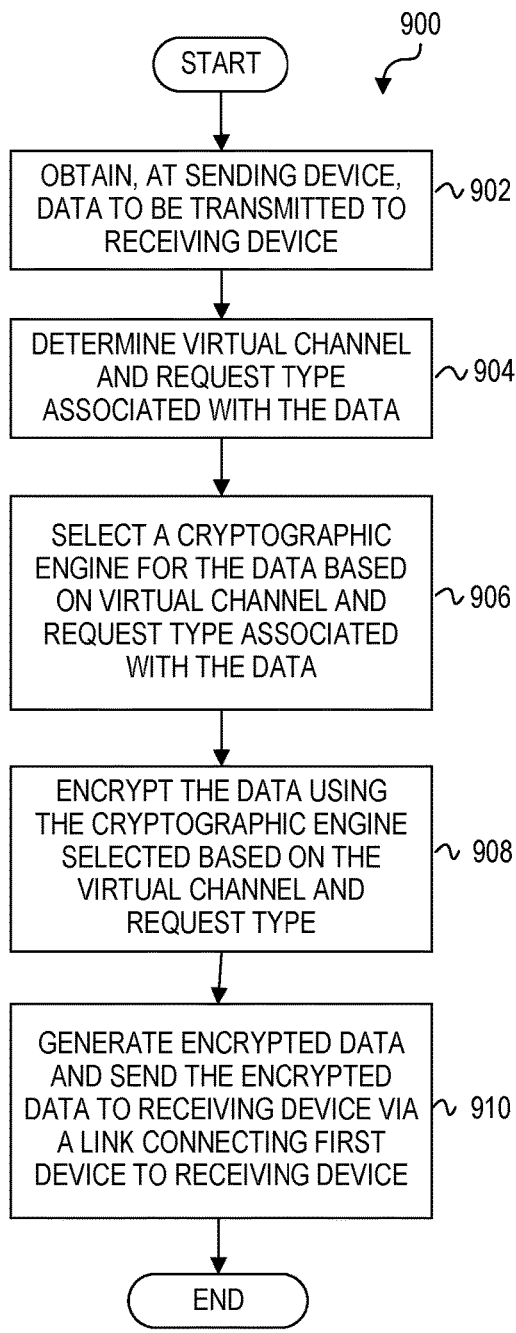
FIG. 9 is a simplified flow chart illustrating an example technique that may be associated with link encryption according to various embodiments.
Figure 10:
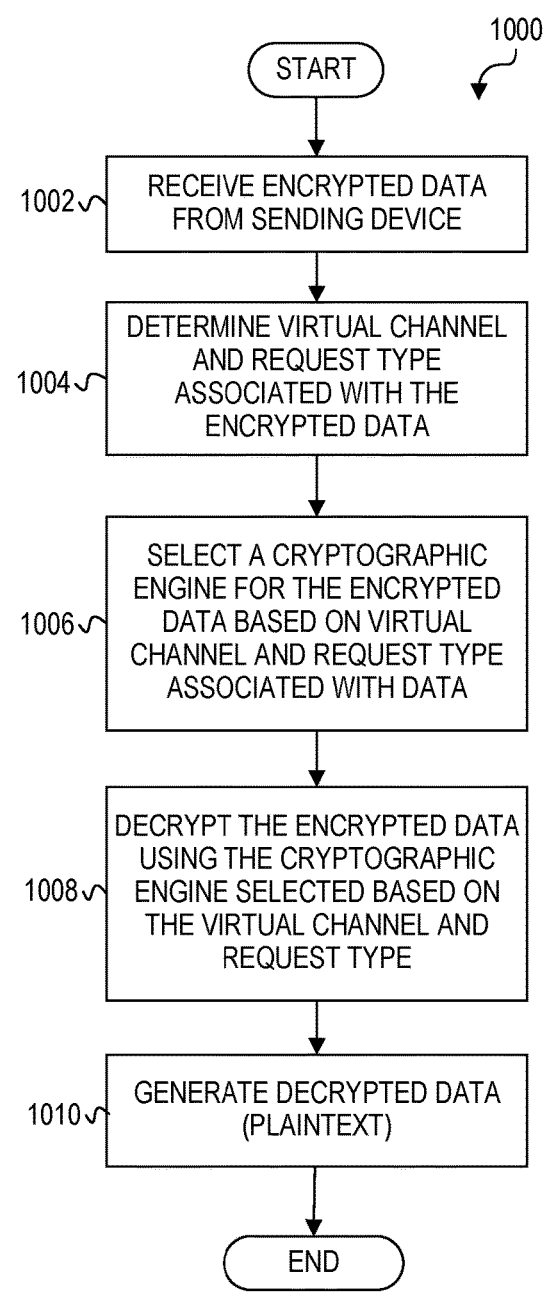
FIG. 10 is a simplified flow chart illustrating an example technique that that may be associated with link encryption according to various embodiments.

FIGS. 9 and 10 are simplified flowcharts 900 and 1000 illustrating example techniques for maintaining link ordering requirements without impacting counter mode encryption of data transmitted over a link. In at least one embodiment, one or more sets of operations correspond to activities in each of FIGS. 9 and 10. A sending device may utilize the one or more sets of operations corresponding to activities of FIG. 9. A receiving device may utilize the one or more sets of operations corresponding to activities of FIG. 10. Devices in a platform (e.g., SoC with PCIe root complex 620, 820, device with PCIe endpoint interface 660, 860) may operate as both a sending device to encrypt and transmit data to another device, and as a receiving device to receive encrypted data from another device and decrypt the encrypted data. The sending device and receiving device may each comprise hardware, firmware, software, or any suitable combination thereof for performing their operations. In one or more embodiments, at least some of the activities in FIG. 9 may be performed by a cryptographic engine (e.g., 834A, 834B, 834C, 864A, 864B, 864C) of an interconnect interface (e.g., 820, 860) of a sending device, and at least some of the activities in FIG. 10 may be performed by a cryptographic engine (e.g., 824A, 824B, 824C, 874A, 874B, 874C) of an interconnect interface (e.g., 820, 860) of a receiving device.

In FIG. 9, at 902, a sending device obtains data to be transmitted to a receiving device. At 904, a determination is made as to which request type is associated with the data. For example, the data may be a posted request type, a nonposted request type, or a completion request type in a PCIe platform. A determination is also made as to which virtual channel and/or traffic class is associated with the data. The data may have a traffic class associated with high priority virtual channel, a regular priority virtual channel, or a low priority virtual channel. In a PCIe device, a packet is generated to contain the data once it is encrypted. A TC attribute and a request type indicator may be added to appropriate fields in a header of the packet.

At 906, a cryptographic engine is selected in the sending device based on the virtual channel and the request type associated with the data. At 908, the data can be encrypted by the selected cryptographic engine using counter mode encryption. At 910, the selected cryptographic engine can generate encrypted data (e.g., ciphertext) and send the encrypted data to the receiving device over a link that connects the sending device to the receiving device. The link may be a PCIe link in one possible example.

With reference to FIG. 10, FIG. 10 illustrates possible activities of a receiving device to which the encrypted data is sent by a sending device at 910. At 1002, the receiving device receives encrypted data from a sending device via a link connecting the receiving device and the sending device.

At 1004, a determination is made as to which virtual channel and request type are associated with the encrypted data. For example, the encrypted data may be a posted request type, a nonposted request type, or a completion request type. In a PCIe implementation, the request type may be determined based on a TLP header field in a packet containing the encrypted data. In a non-limiting example, the encrypted data may have a traffic class associated with high priority virtual channel, a regular priority virtual channel, or a low priority virtual channel. In a PCIe implementation, traffic class may be determined based on a TC attribute in the TLP header field of the packet containing the encrypted data. The TC attribute can be used to obtain the appropriate VC from a TC-to-VC mapping in a configuration block of the receiving device.

At 1006, a cryptographic engine is selected in the sending device based on the virtual channel and the request type associated with the encrypted data. At 1008, the data can be decrypted by the selected cryptographic engine using counter mode decryption. At 1010, the selected cryptographic engine can generate decrypted data (e.g., plaintext), which corresponds to the data that was encrypted by the receiving device (e.g., 908).

Figure 11:
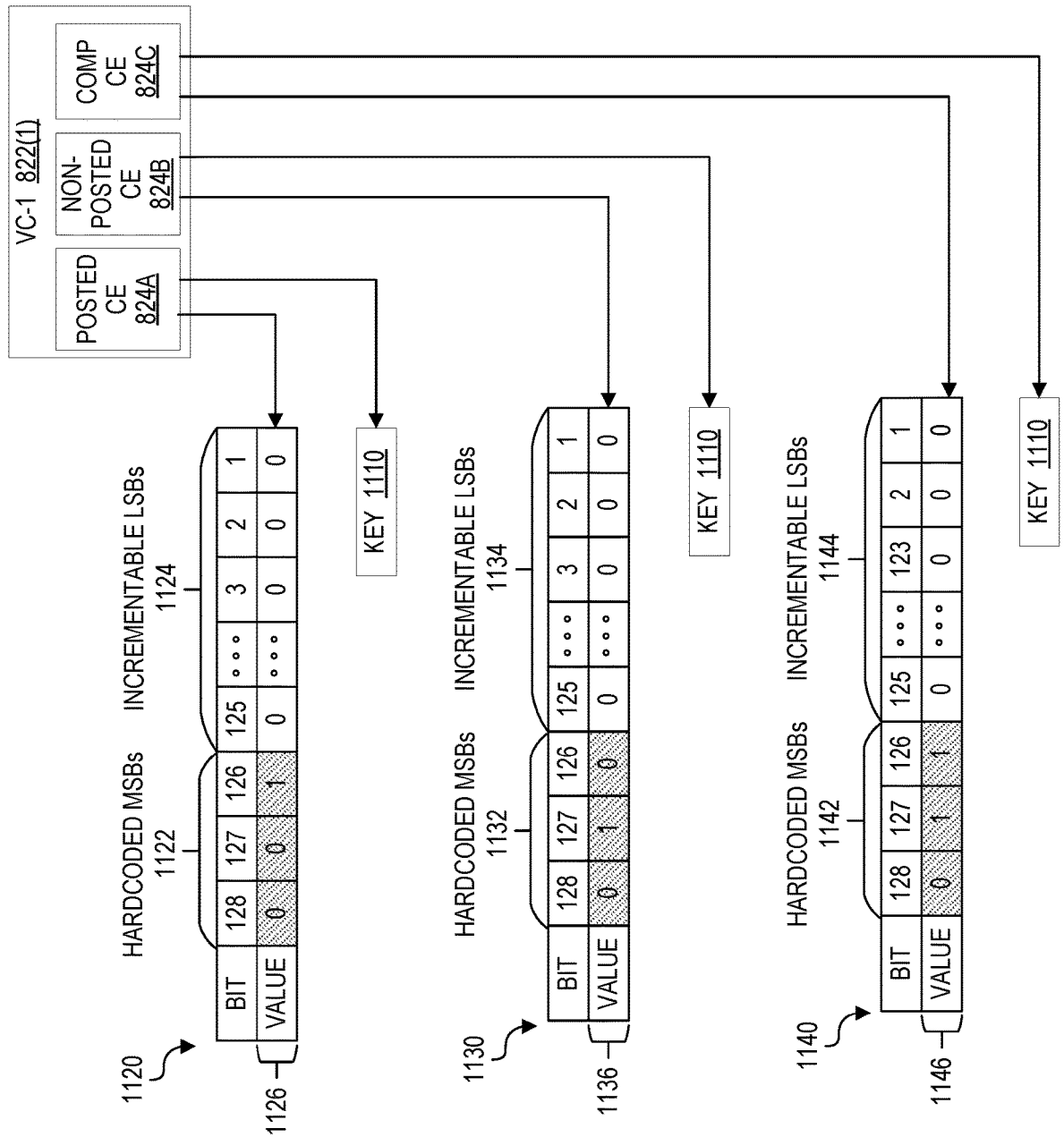
FIG. 11 illustrates an example of possible selected keys and counters in a system with link encryption according to various embodiments.
Figure 12:
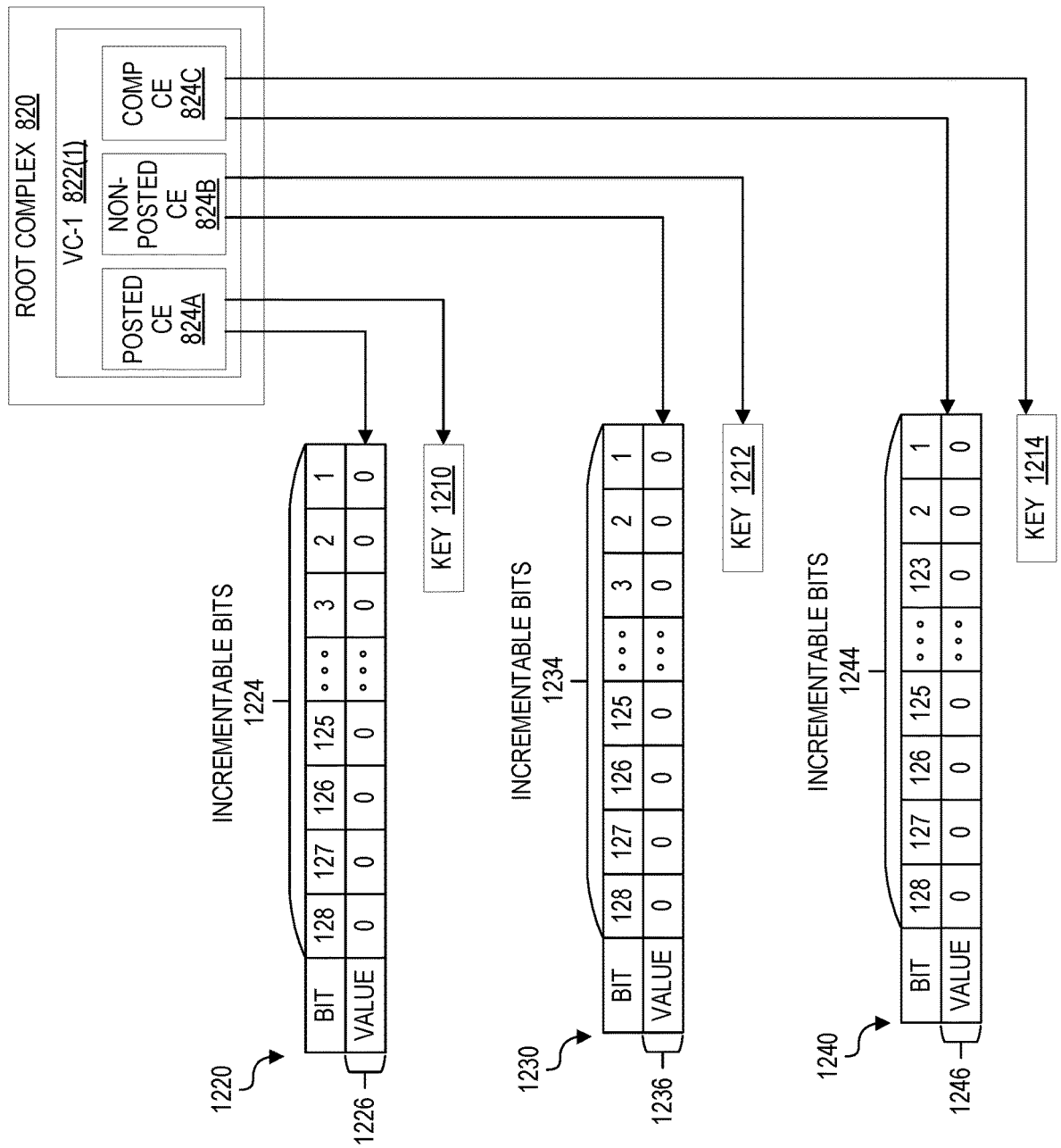
FIG. 12 illustrates an example of possible selected keys and counters in a system with link encryption according to various embodiments.

Turning to FIGS. 11-12, FIGS. 11-12 are block diagrams illustrating possible formats of counters and key selections that may be used to ensure that counter mode security requirements are met in systems with link encryption according to various embodiments. To maintain confidentiality of the data that is encrypted, CTR mode encryption requires that the same counter is not used twice to encrypt two different data blocks with a given key. Thus, keys and counters for each pair of cryptographic engines connected by a link need to be carefully chosen to ensure that the counters remain in sync while meeting this security requirement.

In one or more embodiments with multiple virtual channels and request types as previously described, multiple cryptographic engine pairs may be instantiated to protect link ordering of upstream traffic on a link, and multiple cryptographic engine pairs may be instantiated to protect link ordering of downstream traffic on the same link. Each CE is associated with a dedicated counter, and the counters are incremented independently of each other. The counters of each CE pair connected by a link are to remain in sync; otherwise, the counter mode encryption can fail. One or more embodiments may leverage one of two possible approaches illustrated respectively in FIGS. 11 and 12 for initializing and managing counters to ensure that counter mode security requirements are met.

In FIG. 11, a block diagram illustrates one approach to ensuring that counters of cryptographic engine pairs connected by a link between interconnect interfaces (e.g., root complex 820, endpoint interface 860) of devices remain in sync, without any counter being used twice to encrypt different data blocks with a given key. FIG. 11 shows possible counter and key selections for a virtual channel of a device that implements counter mode link encryption. Specifically, the same key 1110 can be used in all CEs for a link, including the upstream and the downstream traffic across all virtual channels and all request types within the virtual channels. In this embodiment, counters 1120, 1130, and 1140 each have one or more hardcoded bits, and are initialized for cryptographic engines 824A, 824B, and 824C, respectively, in virtual channel VC-1 822(1). One or more of the most significant bits (MSBs) of each counter, referenced as hardcoded MSBs 1122, 1132, and 1142, are hardcoded to a unique value relative to the other MSBs in the other counters. The other bits in the counter, referenced as incrementable least significant bits (LSBs) 1124, 1134, and 1144, can be incremented (e.g., by +1) upon each encryption or decryption. At reset, the LSBs of the counters can be reset to zeros.

It should be noted that for a given pair of CEs on separate devices connected by a link, where the CEs are instantiated for a particular VC and a particular request type (e.g., 824A and 864A, 824B and 864B, 824C and 864C, 834A and 874B, etc.), the counters of the CEs are synchronized. For example, posted CE 824A in VC-1 822(1) on root complex 820 and CE 864A in VC-1 862(1) of endpoint interface 860 each have a counter with the same value hardcoded in the same number of most significant bits. As illustrated in FIG. 11, counter 1120 of posted CE 824A has three hardcoded MSBs with a value of 001. Thus, in at least one embodiment, another counter is initialized for posted CE 864A with the same hardcoded MSBs initialized with the same value of 001. The least significant bits can be reset to zeros when the system is reset. During operation, the counter of CE 864A is incremented independently when data is encrypted and sent over a link to root complex 820, and the counter of CE 824A is incremented independently when the encrypted data is received and decrypted by CE 824A.

In this embodiment, the counters are initialized with values in the hardcoded MSBs of each counter to ensure that the counters remain unique across all CEs of a link. The number of bits to be hardcoded may depend on the number of CEs that are instantiated for that link. For example, if only two CEs are instantiated for a link (e.g., one for upstream traffic and one for downstream traffic) because only one request type is utilized and virtual channels are not utilized, then a single most significant bit may be hardcoded in the counters of the CEs. In another example, if four virtual channels (2 upstream and 2 downstream) have three request types each, then the four most significant bits may be hardcoded in the counters of the CEs.

In FIG. 12, a block diagram illustrates another approach to ensuring that counters of cryptographic engine pairs connected by a link between interconnect interfaces (e.g., root complex 820, endpoint interface 860) of devices remain in sync, without any counter being used twice to encrypt different data blocks with a given key. FIG. 12 shows possible counter and key selections for a virtual channel of a device that implements counter mode link encryption. Specifically, counters 1220, 1230, and 1240 are initialized for cryptographic engines 824A, 824B, and 824C, respectively, associated with virtual channel VC-1 822(1). In this embodiment, different keys 1210, 1212, and 1214 are used in each CE instantiated in an interconnect interface, such as root complex 820. Thus, in at least one embodiment, all bits in the counters may be incrementable, as referenced at 1224, 1234, and 1244.

It should be noted that for a given pair of CEs on separate devices connected by a link, where the CEs are instantiated for a particular VC and a particular request type (e.g., 824A and 864A, 824B and 864B, 824C and 864C, 834A and 874B, etc.), the key used by each CE in the pair is the same. For example, posted CE 824A in VC-1 822(1) on root complex 820 and posted CE 864A in VC-1 862(1) of endpoint interface 860 each use key 1210, nonposted CE 824B in VC-1 822(1) on root complex 820 and nonposted CE 864B in VC-1 862(1) of endpoint interface 860 each use key 1212, and completion CE 824C in VC-1 822(1) on root complex 820 and CE 864C in VC-1 862(1) of endpoint interface 860 each use key 1214.

Turning to FIGS. 13-18, FIGS. 13-18 are various diagrams and charts illustrating example hardware mechanisms and techniques that can be used to detect and recover from fatal errors that may occur in systems with link encryption when counters for counter mode encryption are out of sync. A fatal error may occur, for example, when a packet is malformed or a receiver buffer overflows. For example, the receive side might drop a packet before it reaches the CE, resulting in not incrementing the counter at the receive side while the transmit side incremented its version of the counter for that transaction. The transmit side would be unaware of the packet drop (e.g., malformed Transaction Layer Protocol (TLP)), resulting in the counters being out of sync and invalid data potentially being committed to memory or disk since subsequent packets would be decrypted with the wrong counter. Thus, this can trigger infinite error propagation. It should be noted that fatal link errors when the link is not encrypted does not result in corrupted memory or disk as only the dropped packet is impacted. However, an unencrypted link lacks security needed to ensure that confidentiality is maintained across links between devices in a system.

Figure 13:
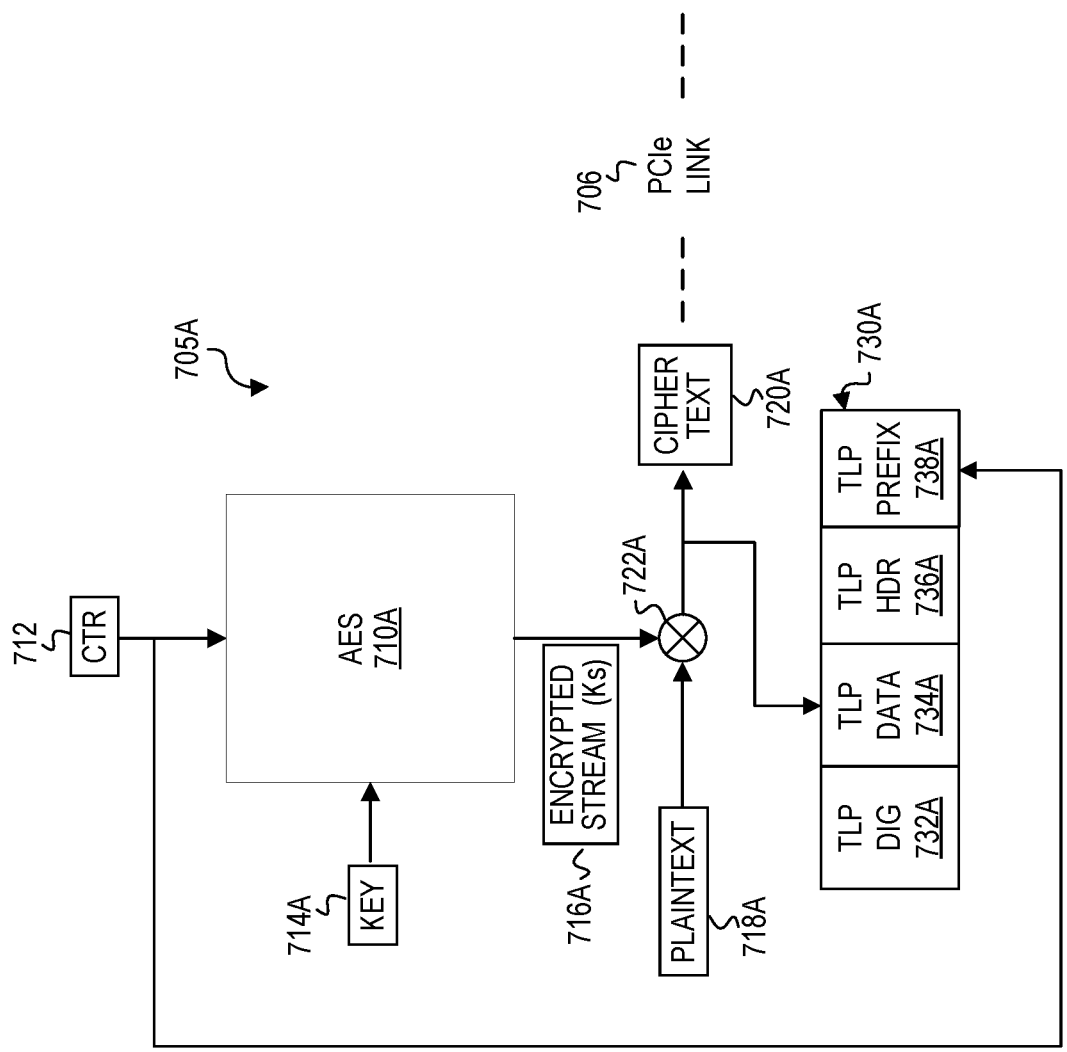
FIG. 13 is a block diagram that illustrates additional functionality of counter mode encryption according to various embodiments.

FIG. 13 is a block diagram illustrating counter mode encryption 705A with additional functionality to enable detection of fatal errors in a system with link encryption. Counter mode encryption 705A, which was previously described with reference to FIG. 7, illustrates one possible technique for a CE of a sending device to include a message with a ciphertext (e.g., 720A) that can be detected by a CE at a receiving device. In this example, the message includes a current counter value derived from a counter associated with the CE at the sending device. The current counter value of the CE at the sending device can be used by the CE at the receiving device to determine whether their counters are out of sync.

In one or more embodiments, a current counter value can be included in a packet that is generated for transmitting the encrypted data (or ciphertext 720A) to the receiving device. As shown in FIG. 13, in one embodiment such as PCIe, a transaction layer packet (TLP) 730A may be generated and include several fields such as TLP Digest field 732A, TLP data field 734A, TLP header field 736A, and TLP prefix field 738A. The TLP data field 734A may be used to store ciphertext 720A, and the TLP prefix field 738A may be used to store the current counter value. In some embodiments, the current counter value that is stored in the TLP prefix field 738A may be derived from the entire counter (e.g., all of the bits). In other embodiments, the current counter value may be derived from a selected number n of least significant bits in the counter. This may be advantageous to reduce the amount of data stored in the packet without significantly sacrificing accuracy when the counters are compared. In other embodiments that will be further described herein, this derived smaller portion of the counter may be used as an index into a table of precomputed keystreams.

Figure 14:
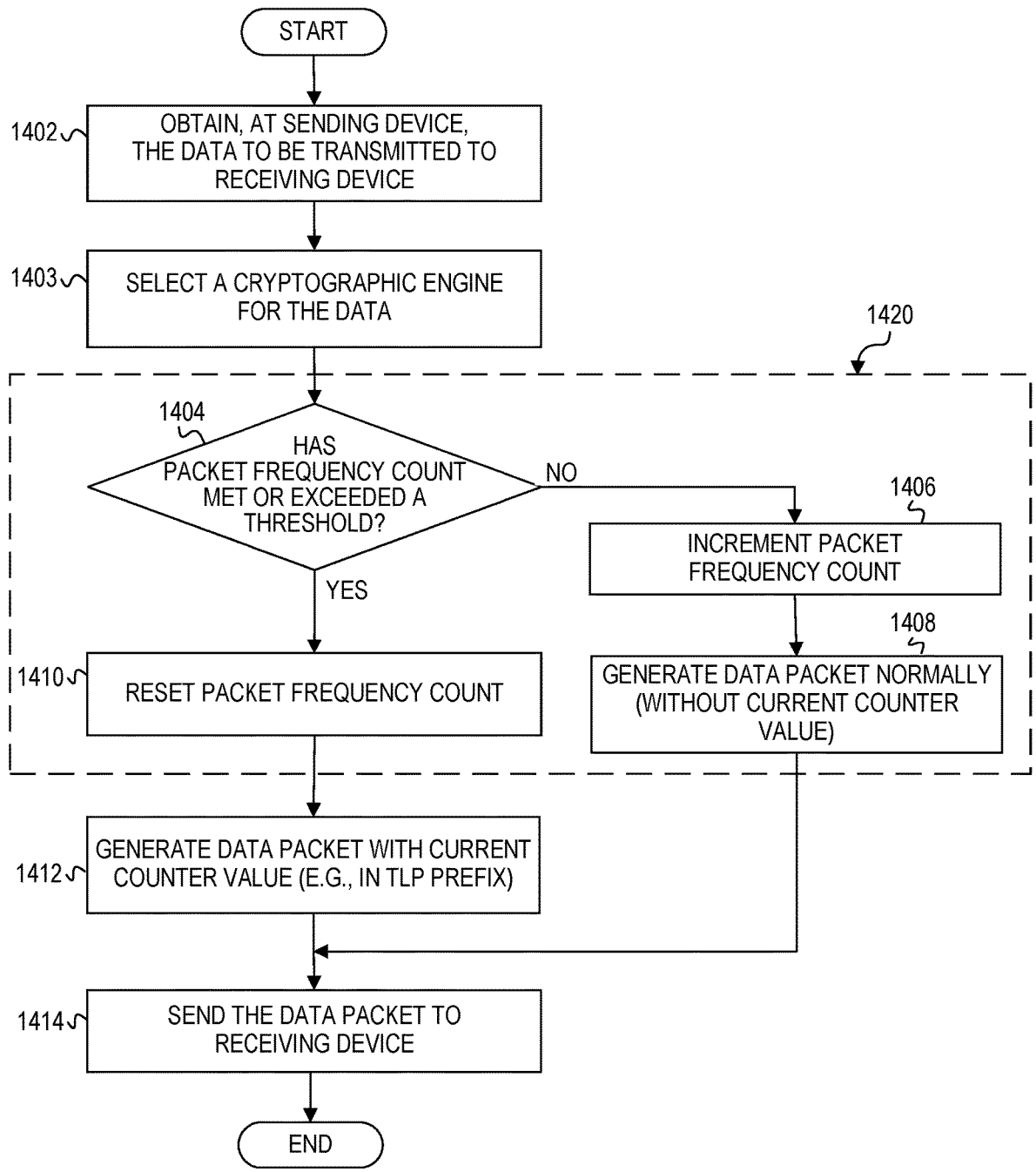
FIG. 14 is a simplified flow chart illustrating an example technique that that may be associated with link encryption according to various embodiments.
Figure 15:
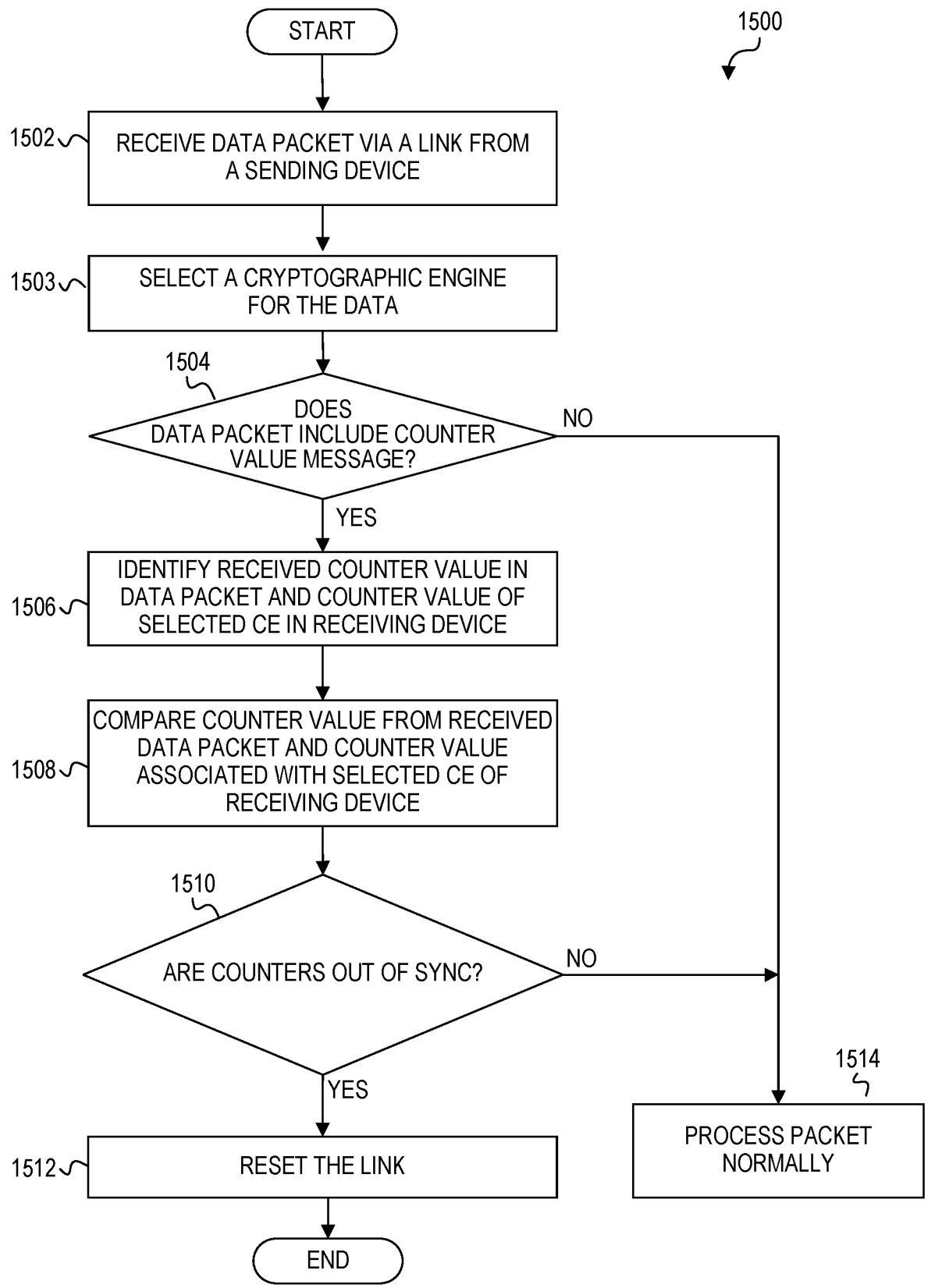
FIG. 15 is a simplified flow chart illustrating an example technique that that may be associated with link encryption according to various embodiments.

FIGS. 14 and 15 are simplified flowcharts 1400 and 1500 illustrating one example technique of including a message with encrypted data sent to a receiving device to enable detection of fatal errors due to out of sync counters in accordance with one or more embodiments. In at least one embodiment, one or more sets of operations correspond to activities of FIGS. 14 and 15. A sending device may utilize the one or more sets of operations corresponding to activities of FIG. 14. A receiving device may utilize the one or more sets of operations corresponding to activities of FIG. 15. The sending device and receiving device may each comprise hardware, firmware, software, or any suitable combination thereof for performing the operations. In one or more embodiments, at least some of the activities in FIGS. 14-15 may be performed by a cryptographic engine (e.g., 834A, 834B, 834C, 864A, 864B, 864C) and/or a transaction layer (e.g., 821, 861) of an interconnect interface (e.g., 820, 860) of a sending device, and at least some of the activities in FIG. 15 may be performed by a cryptographic engine (e.g., 824A, 824B, 824C, 874A, 874B, 874C) and/or a transaction layer (e.g., 821, 861) of an interconnect interface (e.g., 820, 860) of a receiving device.

In the embodiment shown in FIGS. 14-15, the current counter value of the sending device is transmitted with a data packet, at a configurable frequency. This counter value can be identified by a specific message (also referred to herein as a 'counter value message') detected by the CE (e.g., a TLP prefix for PCIe protocol) on the receive side, which can then check if counters on both sides are still in sync. In at least one implementation, if the counters are determined to be out-of-sync, the link can be reset/brought down. This option is advantageous due to its low bandwidth impact while preventing corruption of disk or memory.

With reference to FIG. 14, at 1402, a sending device obtains data to be transmitted to a receiving device. At 1403, a cryptographic engine for the data is selected. The appropriate CE may be selected according to virtual channels and/or request types associated with the data, as previously described herein with reference to FIGS. 9-10.

At 1404, a determination is made as to whether a packet frequency count for has met or exceeded a given threshold. Depending on the implementation, the packet frequency count may be applicable per link, per CE, per VC, or per request type of a VC. If the packet frequency count has not met or exceeded a threshold, then at 1406, the packet frequency count can be incremented (e.g., by +1). At 1408, a data packet for transmitting the data can be generated normally, without the current counter value associated with the CE.

If it is determined at 1404 that the packet frequency count has met or exceeded a threshold, then at 1410, the packet frequency count may be reset to zero. At 1412, a data packet can be generated to include the current counter value of the counter associated with the selected CE. In one example, the current counter value may be stored in a TLP prefix of the data packet. In addition, encrypted data to be transmitted to the receiving device may also be stored in the data packet.

At 1414, once a data packet has been generated with the encrypted data and with or without the current counter value depending on the packet frequency count (e.g., at 1412 or 1408), the data packet can be sent to the receiving device.

It should be noted that the activities shown and described at 1420 allow for including the current counter value with encrypted data at a configurable frequency. Thus, if the current counter value is to be included with every instance of encrypted data (e.g., in every data packet), then these activities 1404-1410 may be omitted for those embodiments.

With reference to FIG. 15, at 1502, the receiving device receives a data packet over a link from a sending device. At 1503, a cryptographic engine for the data packet is selected. The appropriate CE may be selected according to virtual channels and/or request types associated with the data packet, as previously described herein with reference to FIGS. 9-10.

At 1504, a determination is made as to whether the data packet includes a counter value message. For example, the CE at the sending device that generated the encrypted data in the data packet may be configured with a frequency that causes the receiving device to send the counter value every 100 data packets. Thus, not every data packet would include a counter value message to be compared to a counter value of a counter associated with the corresponding CE on the receiving device. At 1504, if it is determined that the data packet does not include a counter value message, then at 1514, the data packet is processed normally.

At 1504, if it is determined that the data packet does include a counter value message, then at 1506, the counter value in the data packet can be identified and a counter value associated with the selected CE in the receiving device can be identified. It should be noted that in at least some embodiments, multiple CEs may be instantiated in the receiving device for the same link, as previously described herein (e.g., CEs instantiated per VC and per request type). Thus, the correct CE in the receiving device has to be selected in order to identify the correct counter value to be compared to the counter value from the received data packet.

At 1508, the counter value from the received data packet is compared to the counter value associated with the selected CE of the receiving device. At 1510, a determination is made as to whether the counter value from the received data packet and the counter value associated with the selected CE of the receiving device are out of sync. If it is determined at 1510 that the two counters are not out of sync, then at 1514, the data packet may be process normally. If it is determined at 1510 that the two counters are out of sync, then at 1512, the link may be reset. In one example, when a link is reset (e.g., the link is brought down) the secret keys are reset and the entire flow of re-initializations of secret keys that are required to re-establish upon link up. When the link retrains up, the link remains unencrypted until the new secret keys are re-established. In addition, the counter starts from beginning to produce a new sets of keystreams.

Figure 16:
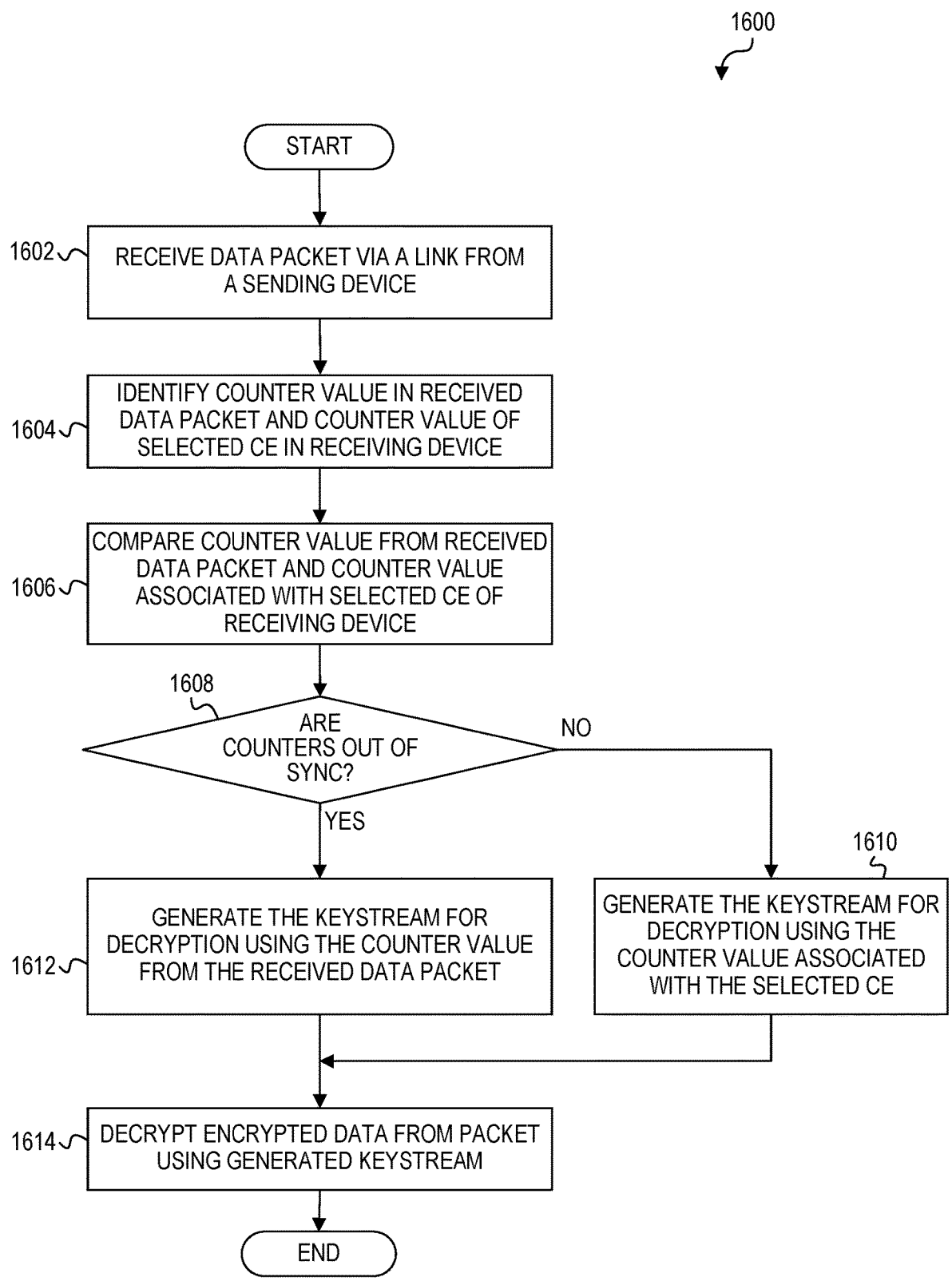
FIG. 16 is a simplified flow chart illustrating an example technique that that may be associated with link encryption according to various embodiments.

FIG. 16 is a simplified flowchart 1600 illustrating one example technique of forcing a counter to be in sync at a cryptographic engine in receiving device in accordance with at least one embodiment where a corresponding cryptographic engine in a sending device sends a counter value message with each data packet. In at least one embodiment, one or more sets of operations correspond to activities of FIG. 16. A receiving device (e.g., SoC with PCIe root complex 820, PCIe device with PCIe endpoint interface 860) may utilize the one or more sets of operations corresponding to activities of FIG. 16. The receiving device may comprise hardware, firmware, software, or any suitable combination thereof for performing the operations. In one or more embodiments, at least some of the activities in FIG. 16 may be performed by a cryptographic engine (e.g., 824A, 824B, 824C, 874A, 874B, 874C) and/or a transaction layer (e.g., 821, 861) of an interconnect interface (e.g., 820, 860) of a receiving device.

In the embodiment illustrated by flowchart 1600 in FIG. 16, the current counter value of the sending device is assumed to be transmitted with every data packet, which is one embodiment that was described with reference to FIG. 14. At 1602, the receiving device receives a data packet over a link from a sending device.

At 1604, the counter value in the data packet can be identified and a counter value associated with the appropriate CE in the receiving device can be identified. It should be noted that in at least some embodiments, multiple CEs may be instantiated in the receiving device for the same link, as previously described herein (e.g., CEs instantiated per VC and per request type). Thus, the correct CE in the receiving device is selected in order to identify the counter value to be compared to the counter value from the received data packet.

At 1606, the counter value from the received data packet is compared to the counter value associated with the selected CE of the receiving device. At 1608, a determination is made as to whether the counter value from the received data packet and the counter value associated with the selected CE of the receiving device are out of sync.

If it is determined at 1608 that the two counters are not out of sync, then at 1610, a keystream for performing decryption by the selected CE is generated using the counter value associated with the selected CE and a key associated with the selected CE. For example, an AES crypto block (e.g., 710B) can use the key to encrypt the counter value associated with the selected CE and produce a keystream or encrypted stream (e.g., 716B). At 1614, the encrypted data in the data packet is retrieved and decrypted by the selected CE on the receiving device using the keystream generated based on the counter value of the selected CE.

If it is determined at 1608 that the two counters are out of sync, then at 1612, a keystream for performing decryption by the selected CE is generated using the counter value in the data packet and a key associated with the selected CE. For example, an AES crypto block (e.g., 710B) can use the key to encrypt the counter value in the data packet and produce a keystream or encrypted stream (e.g., 716B). At 1614, the encrypted data in the data packet is retrieved and decrypted by the selected CE on the receiving device using the keystream generated based on the counter value sent by the sending device in the received data packet.

Figure 17:
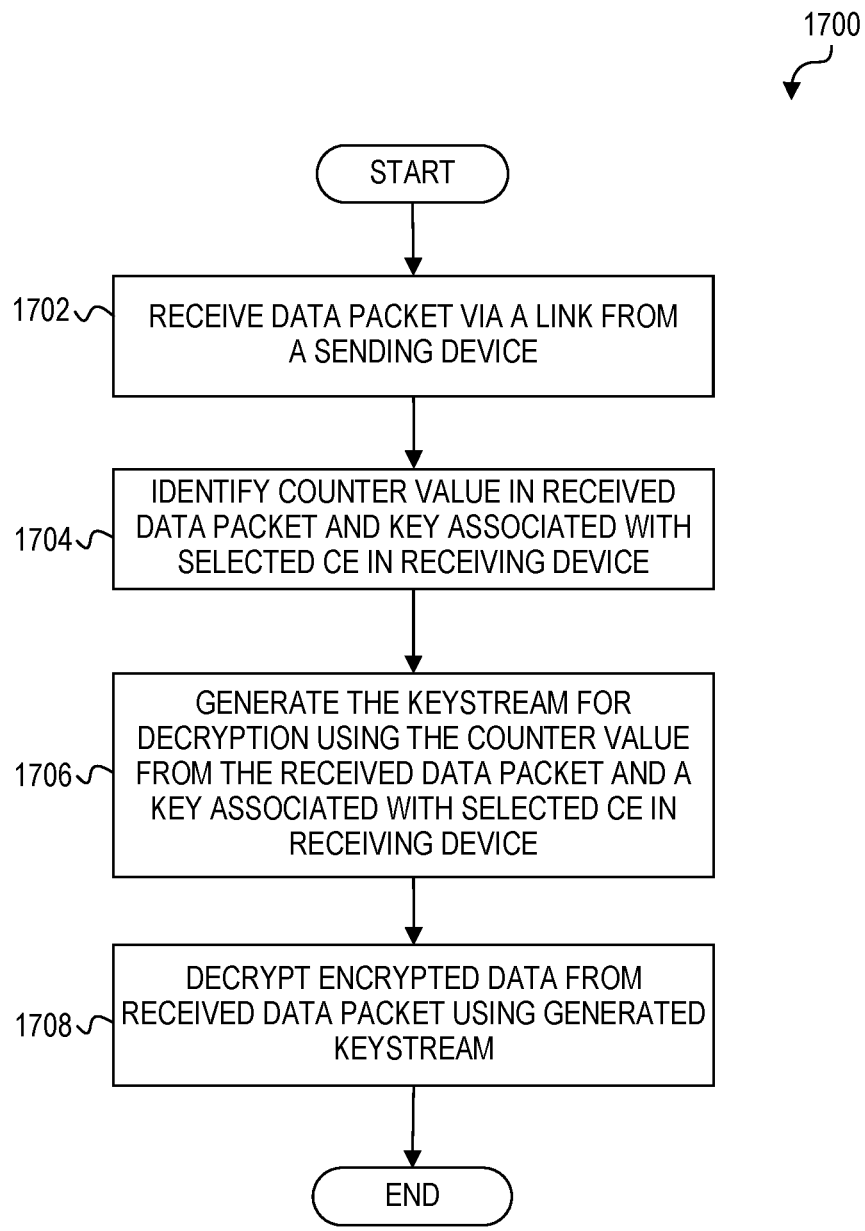
FIG. 17 is a simplified flow chart illustrating an example technique that that may be associated with link encryption according to various embodiments.

FIG. 17 is a simplified flowchart 1700 illustrating another example technique of forcing a counter to be in sync for a cryptographic engine in a receiving device in accordance with at least one embodiment where a corresponding cryptographic engine in a sending device sends a counter value message with each data packet. In at least one embodiment, one or more sets of operations correspond to activities of FIG. 17. A receiving device (e.g., SoC with PCIe root complex 820, PCIe device with PCIe endpoint interface 860) may utilize the one or more sets of operations corresponding to activities of FIG. 17. The receiving device may comprise hardware, firmware, software, or any suitable combination thereof for performing the operations. In one or more embodiments, at least some of the activities in FIG. 16 may be performed by a cryptographic engine (e.g., 824A, 824B, 824C, 874A, 874B, 874C) and/or a transaction layer (e.g., 821, 861) of an interconnect interface (e.g., 820, 860) of a receiving device.

In the embodiment illustrated by flowchart 1700 in FIG. 17, the current counter value of a CE in a sending device is assumed to be transmitted with every data packet, which is one embodiment that was described with reference to FIG. 14. At 1702, the receiving device receives a data packet over a link from a sending device.

At 1704, a counter value in the data packet can be identified and a counter value associated with the appropriate CE in the receiving device can be identified. It should be noted that in at least some embodiments, multiple CEs may be instantiated in the receiving device for the same link, as previously described herein (e.g., CEs instantiated per VC and per request type). Thus, the correct CE in the receiving device is selected in order to identify the counter value to be compared to the counter value from the received data packet.

At 1706, a keystream for performing decryption by the selected CE is generated using the counter value from the data packet and a key associated with the selected CE. For example, an AES crypto block (e.g., 710B) can use the key to encrypt the counter value in the data packet and produce a keystream or encrypted stream (e.g., 716B). At 1708, the encrypted data in the data packet is retrieved and decrypted by the selected CE on the receiving device using the generated keystream.

Figure 18:
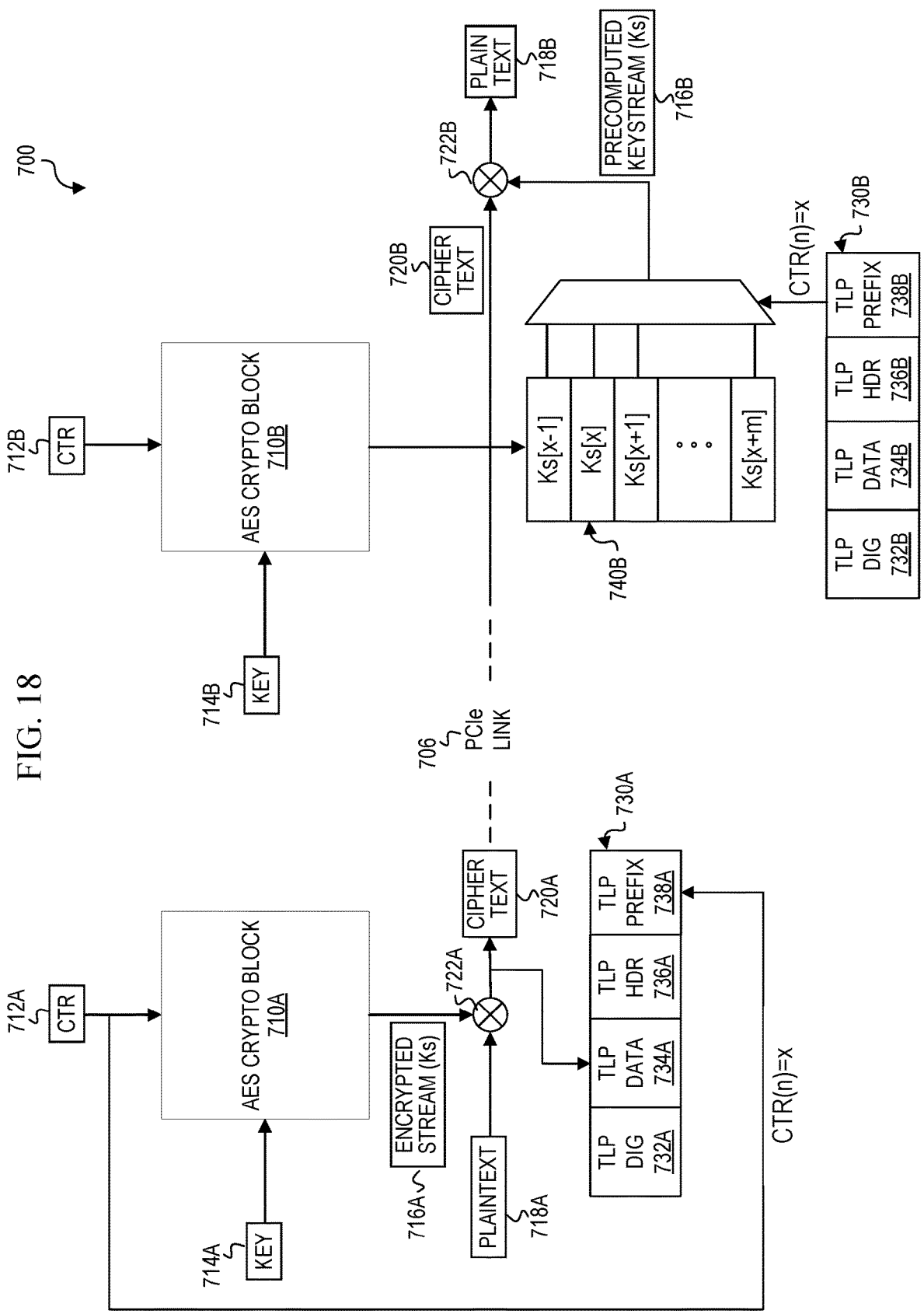
FIG. 18 illustrates additional functionality to optimize counter mode encryption and decryption according to various embodiments.

FIG. 18 is a block diagram illustrating counter mode encryption scheme 700 with additional functionality to optimize detection of and recovery from fatal errors in a system with link encryption according to one or more embodiments. In at least some scenarios, the additional functionality added in FIG. 18 can reduce the latency that may be added in embodiments where a keystream is computed each time a data packet is received.

In FIG. 18, counter mode encryption 705A, which was previously described herein (e.g., with reference to FIGS. 7 and 13), illustrates one possible technique for a CE of a sending device to include a counter value message with a ciphertext (e.g., 720A) that is transmitted to a receiving device, where the counter value message can be detected by a CE at the receiving device that is paired with the CE at the sending device. In the embodiment shown in FIG. 18, the counter value message can include a selected number n of least significant bits of the counter associated with the CE at the sending device. The n least significant bits of the counter are represented herein by CTR(n). In an embodiment with PCIe links, the sending device can attach CTR(n) of the counter to a data packet 730A by storing CTR(n) of the counter in the TLP prefix field 738A of the data packet 730A.

On the receiving side, the n least significant bits attached to the data packet can be used by the CE on the receiving device that is paired to the CE on the sending device to index into an m-entry table 7406. Indexing into table 7406 locates a precomputed encrypted stream (or keystream) 716B, which can be used in XOR operation 722B to decrypt ciphertext 7206 into plaintext 718B. The m-entry table 7406 contains precomputed keystreams Ks[x−1] through Ks[x+m]. The value of m can be the maximum number of prefetch keystream entries available in table 7406.

In one or more embodiments, when the system is booted or reset, the counters on the receiving and sending devices are reset. Counters associated with paired CEs are seeded with the same value. For example, some counters may be seeded with all zeros, whereas counters that have hardcoded bits (e.g., FIG. 11) may be seeded with zeros in their incrementable least significant bits and hardcoded values in their hardcoded most significant bits. Initially, the precomputed keystreams can be generated at reset or boot by performing multiple iterations of AES encryption at AES crypto block 7106 using a key associated with the CE and the counter value associated with the CE, which is incremented for each iteration of the AES encryption.

The size of n can be chosen depending on the probability of losing consecutive data packets on the underlying link and protocol. For example, the greater the probability of losing consecutive data packets, the greater the value of n. Additional keystreams may continue to be precomputed to keep the m-entry table full until the system is reset or shut down and booted up again. In alternate embodiments, other approaches may be employed instead.

Figure 19:
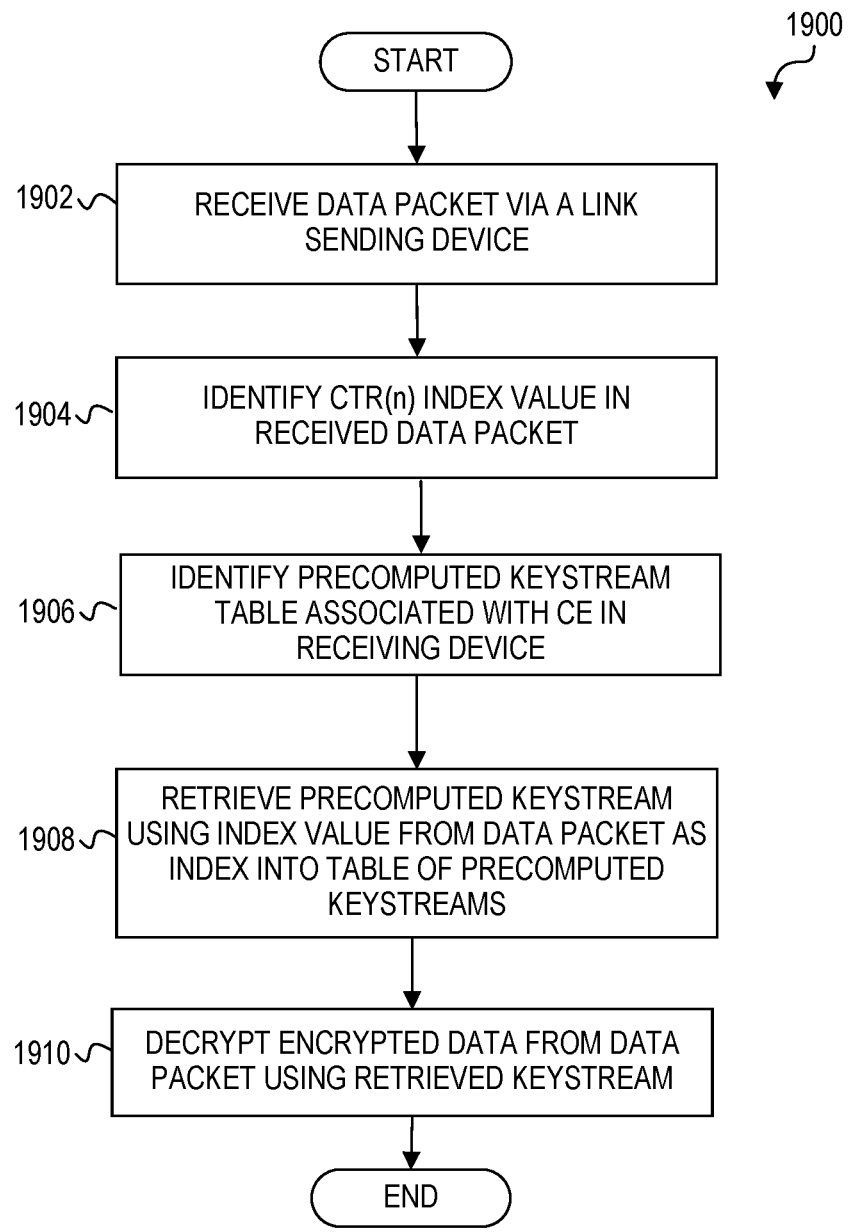
FIG. 19 is a simplified flow chart illustrating an example technique that that may be associated with link encryption according to various embodiments.

FIG. 19 is a simplified flowchart 1900 illustrating one optimized technique of forcing a counter to be in sync at a cryptographic engine of a receiving device where the corresponding cryptographic engine of a sending device sends a counter value message with each data packet. FIG. 19 illustrates a flow that eliminates latency that may be added in embodiments in which a keystream is computed for each data packet that is received, and also eliminates fatal errors that may occur from a counter being out of sync. In at least one embodiment, one or more sets of operations correspond to activities of FIG. 19. A receiving device (e.g., SoC with PCIe root complex 820, PCIe device with PCIe endpoint interface 860) may utilize the one or more sets of operations corresponding to activities of FIG. 19. The receiving device may comprise hardware, firmware, software, or any suitable combination thereof for performing the operations. In one or more embodiments, at least some of the activities in FIG. 16 may be performed by a cryptographic engine (e.g., 824A, 824B, 824C, 874A, 874B, 874C) and/or a transaction layer (e.g., 821, 861) of an interconnect interface (e.g., 820, 860) of a receiving device.

In the embodiment illustrated by flowchart 1900 in FIG. 19, an index value is assumed to be transmitted with every data packet, as shown in FIG. 18. The index value is the n least significant bits (or CTR(n)) of a current counter value associated with the CE of the sending device. At 1902, the receiving device receives a data packet over a link from a sending device. It should be noted that in at least some embodiments, multiple CEs may be instantiated in the receiving device for the same link, as previously described herein (e.g., CEs instantiated per VC and per request type). Thus, the correct CE in the receiving device is selected in order to identify the correct table from which to fetch the correct precomputed keystream.

At 1904, the index value in the data packet can be identified. At 1906, a precomputed keystream table associated with the CE in the receiving device is identified. At 1908, the index value from the received data packet is used to index into the precomputed keystream table to retrieve the correct precomputed keystream to be used to decrypt the encrypted data in the received data packet. At 1910, the encrypted data in the data packet is retrieved and decrypted by the selected CE on the receiving device using the keystream retrieved from the precomputed keystream table.

Figure 20:
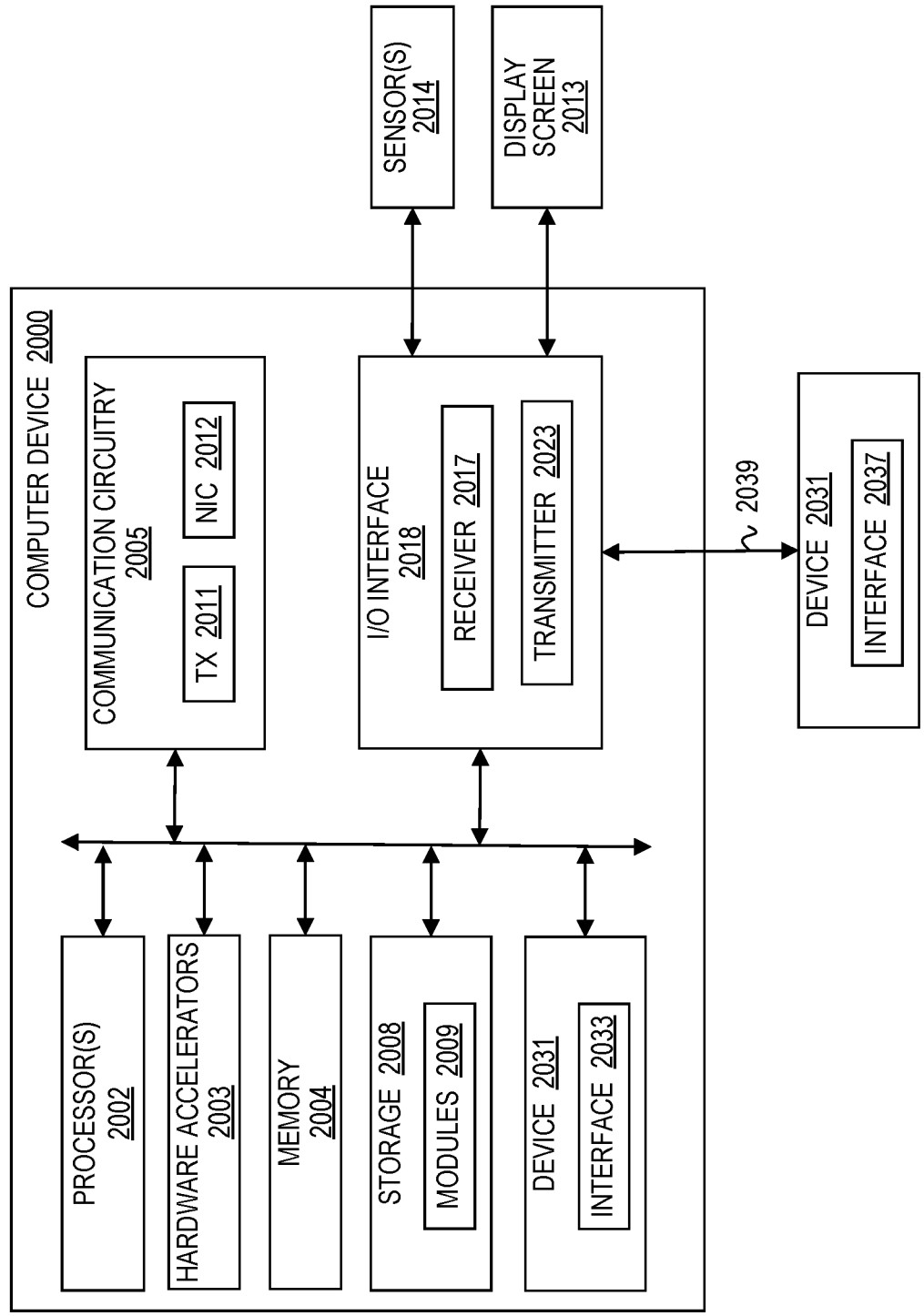
FIG. 20 illustrates an example device suitable for use to practice various aspects of the present disclosure, in accordance with various embodiments.

FIG. 20 illustrates an example device suitable for use to practice the present disclosure, in accordance with various embodiments. As shown, the device 2000 may include one or more processors 2002, each having one or more processor cores, or and optionally, a hardware accelerator 2003 (which may be an ASIC or a FPGA). In alternate embodiments, the hardware accelerator 2003 may be part of processor 2002, or integrated together on a SOC.

Additionally, the device 2000 may include a memory 2004, which may be any one of a number of known volatile storage medium, and a persistent data storage circuitry 2008 including modules 2009. In addition, the 2000 may include an I/O interface 2018, coupled to one or more sensors 2014, and a display screen 2013. The I/O interface 2018 may include a transmitter 2023 and a receiver 2017. Furthermore, the device 2000 may include communication circuitry 2005 including a transceiver (Tx) 2011, and network interface controller (NIC) 2012. The elements may be coupled to each other via system bus 2006, which may represent one or more buses. In the case of multiple buses, they may be bridged by one or more bus bridges (not shown). A device 2031 may be coupled to the system bus 2006, and a device 2035 may be coupled to a computer bus 2039. The device 2031 may include an interface 2033, and the device 2035 may include an interface 2037. In embodiments, data storage circuitry 2008 may be persistent storage such as a solid state drive (SSD). Processor(s) 2002 may also be coupled to persistent data storage circuitry 2008 via another bus (e.g., a PCIe bus), directly or via a peripheral controller. For some of these embodiments, processor(s) 2002 and data storage circuitry 2008 may incorporate the teaching of the present disclosure to protect the data exchanged over the link coupling processor(s) 2002 and data storage circuitry 2008.

In embodiments, the processor(s) 2002 (also referred to as "processor circuitry 2002") may be one or more processing elements configured to perform basic arithmetical, logical, and input/output operations by carrying out instructions. Processor circuitry 2002 may be implemented as a stand-alone system/device/package or as part of an existing system/device/package. The processor circuitry 2002 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 2002 may be a part of a SoC in which the processor circuitry 2002 and other components discussed herein are formed into a single IC or a single package. As examples, the processor circuitry 2002 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 2002 may include a sensor hub, which may act as a coprocessor by processing data obtained from the one or more sensors 2014. The sensor hub may include circuitry configured to integrate data obtained from each of the one or more sensors 2014 by performing arithmetical, logical, and input/output operations. In embodiments, the sensor hub may capable of timestamping obtained sensor data, providing sensor data to the processor circuitry 2002 in response to a query for such data, buffering sensor data, continuously streaming sensor data to the processor circuitry 2002 including independent streams for each sensor of the one or more sensors 2014, reporting sensor data based upon predefined thresholds or conditions/triggers, and/or other like data processing functions.

In embodiments, the memory 2004 (also referred to as "memory circuitry 2004" or the like) may be circuitry configured to store data or logic for operating the computer device 2000. The memory circuitry 2004 may include number of memory devices may be used to provide for a given amount of system memory. As examples, the memory circuitry 2004 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 2004 may include one or more mass-storage devices, such as a solid state disk drive (SSDD); flash memory cards, such as SD cards, microSD cards, xD picture cards, and the like, and USB flash drives; on-die memory or registers associated with the processor circuitry 2002 (for example, in low power implementations); a micro hard disk drive (HDD); three dimensional cross-point (3D XPOINT) memories from Intel® and Micron®, etc.

Where FPDs are used, the processor circuitry 2002 and memory circuitry 2004 (and/or data storage circuitry 2008) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 2002 to implement various logic functions. The memory cells may include any combination of various levels of memory/storage including, but not limited to, EPROM, EEPROM, flash memory, SRAM, anti-fuses, etc.

In embodiments, the data storage circuitry 2008 (also referred to as "storage circuitry 2008" or the like), with shared or respective controllers, may provide for persistent storage of information such as modules 2009, operating systems, etc. The data storage circuitry 2008 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 2002; hard disk drives (HDDs); micro HDDs; resistance change memories; phase change memories; holographic memories; or chemical memories; among others. As shown, the data storage circuitry 2008 is included in the computer device 2000; however, in other embodiments, the data storage circuitry 2008 may be implemented as one or more devices separated from the other elements of computer device 2000.

In some embodiments, the data storage circuitry 2008 may include an operating system (OS) (not shown), which may be a general purpose operating system or an operating system specifically written for and tailored to the computer device 2000. The OS may include one or more drivers, libraries, and/or application programming interfaces (APIs), which provide program code and/or software components for modules 2009 and/or control system configurations to control and/or obtain/process data from the one or more sensors 2014.

The modules 2009 may be software modules/components used to perform various functions of the computer device 2000 and/or to carry out functions of the example embodiments discussed herein. In embodiments where the processor circuitry 2002 and memory circuitry 2004 includes hardware accelerators (e.g., FPGA cells, the hardware accelerator 2003) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 2009 may comprise logic for the corresponding entities discussed with regard to the display screen 2013, an on-screen input device (not shown) an on-screen input interface controller (not shown), an off-screen input device (not shown), the transmitter 2023, and the receiver 2017.

The components of computer device 2000 may communicate with one another over the bus 2006. The bus 2006 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), or some other proprietary bus used in a SoC based interface; or any number of other technologies. In some embodiments, the bus 2006 may be a controller area network (CAN) bus system, a Time-Trigger Protocol (UP) system, or a FlexRay system, which may allow various devices (e.g., the one or more sensors 2014, etc.) to communicate with one another using messages or frames.

The communications circuitry 2005 may include circuitry for communicating with a wireless network or wired network. For example, the communication circuitry 2005 may include transceiver (Tx) 2011 and network interface controller (NIC) 2012. Communications circuitry 2005 may include one or more processors (e.g., baseband processors, modems, etc.) that are dedicated to a particular wireless communication protocol.

NIC 2012 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 2012 may be included to allow connect to a second network (not shown) or other devices, for example, a first NIC 2012 providing communications to the network 150 over Ethernet, and a second NIC 2012 providing communications to other devices over another type of network, such as a personal area network (PAN) including a personal computer (PC) device. In some embodiments, the various components of the device 2000, such as the one or more sensors 2014, etc. may be connected to the processor(s) 2002 via the NIC 2012 as discussed above rather than via the I/O circuitry 2018 as discussed infra.

The Tx 2011 may include one or more radios to wirelessly communicate with a network and/or other devices. The Tx 2011 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 2000. In some embodiments, the various components of the device 2000, such as the one or more sensors 2014, etc. may be connected to the device 2000 via the Tx 2011 as discussed above rather than via the I/O circuitry 2018 as discussed infra. In one example, the one or more sensors 2014 may be coupled with device 2000 via a short range communication protocol.

The Tx 2011 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4$^{th}$ Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others.

The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 2018 may include circuitry, such as an external expansion bus (e.g., Universal Serial Bus (USB), FireWire, Thunderbolt, PCI/PCIe/PCIx, etc.), used to connect computer device 2000 with external components/devices, such as one or more sensors 2014, etc. I/O interface circuitry 2018 may include any suitable interface controllers and connectors to interconnect one or more of the processor circuitry 2002, memory circuitry 2004, data storage circuitry 2008, communication circuitry 2005, and the other components of computer device 2000. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 2006), ports, slots, jumpers, interconnect modules, receptacles, modular connectors, etc. The I/O circuitry 2018 may couple the device 2000 with the one or more sensors 2014, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 2014 may be any device configured to detect events or environmental changes, convert the detected events into electrical signals and/or digital data, and transmit/send the signals/data to the computer device 2000. Some of the one or more sensors 2014 may be sensors used for providing computer-generated sensory inputs. Some of the one or more sensors 2014 may be sensors used for motion and/or object detection. Examples of such one or more sensors 2014 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 2014 may include a lens-less image capture mechanism comprising an array of aperture elements, wherein light passing through the array of aperture elements define the pixels of an image. In embodiments, the motion detection one or more sensors 2014 may be coupled with or associated with light generating devices, for example, one or more infrared projectors to project a grid of infrared light onto a scene, where an infrared camera may record reflected infrared light to compute depth information.

Some of the one or more sensors 2014 may be used for position and/or orientation detection, ambient/environmental condition detection, and the like. Examples of such one or more sensors 2014 may include, inter alia, microelectromechanical systems (MEMS) with piezoelectric, piezoresistive and/or capacitive components, which may be used to determine environmental conditions or location information related to the computer device 2000. In embodiments, the MEMS may include 3-axis accelerometers, 3-axis gyroscopes, and/or magnetometers. In some embodiments, the one or more sensors 2014 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 2002, the hardware accelerator 2003, the memory 2004, the data storage circuitry 2008 including the modules 2009, the input/output interface 2018, the one or more sensors 2014, the communication circuitry 2005 including the Tx 2011, the NIC 2012, the system bus 2006, the computer bus 2039, the device 2031, the device 2035, may perform its conventional functions known in the art. In addition, they may be employed to store and host execution of programming instructions implementing various operating system functions and/or applications. The various elements may be implemented by assembler instructions supported by processor(s) 2002 or high-level languages, such as, for example, C, that can be compiled into such instructions. Operations associated with the device 2000 not implemented in software may be implemented in hardware, e.g., via hardware accelerator 2003.

The number, capability and/or capacity of these elements 2002-2039 may vary, depending on the number of other devices the device 2000 is configured to support. Further, in addition to processor(s) 2002 and data storage circuitry 2008, other components of device 2000 may also be incorporated with technology of the present disclosure to protect the data exchanged on a link coupling a pair of the components. Otherwise, the constitutions of elements 2002-2039 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 21:
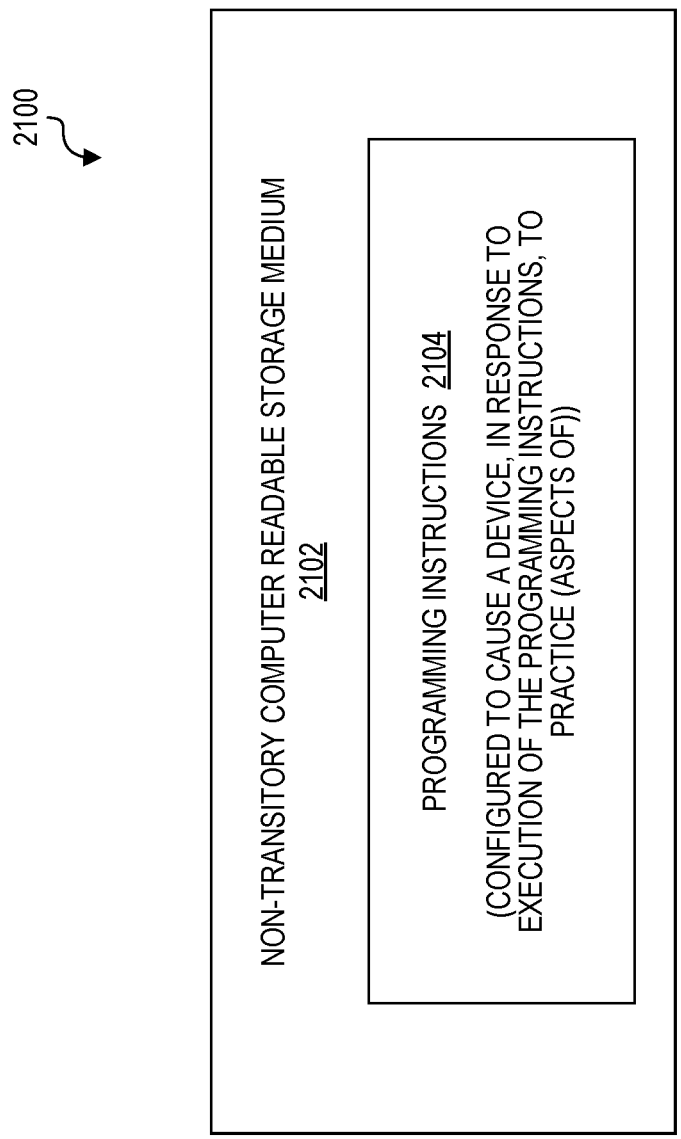
FIG. 21 illustrates a storage medium having executable instructions, in accordance with various embodiments.

Furthermore, the present disclosure may take the form of a computer program product embodied in any tangible or non-transitory medium of expression having computer-usable program code embodied in the medium. FIG. 21 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 2102 may include a number of programming instructions 2104. Programming instructions 2104 may be configured to enable a device, e.g., device 2000, in response to execution of the programming instructions, to perform, e.g., various programming operations associated with operating system functions and/or applications.

In alternate embodiments, programming instructions 2104 may be disposed on multiple computer-readable non-transitory storage media 2102 instead. In alternate embodiments, programming instructions 2104 may be disposed on computer-readable transitory storage media 2102, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Figure 22:
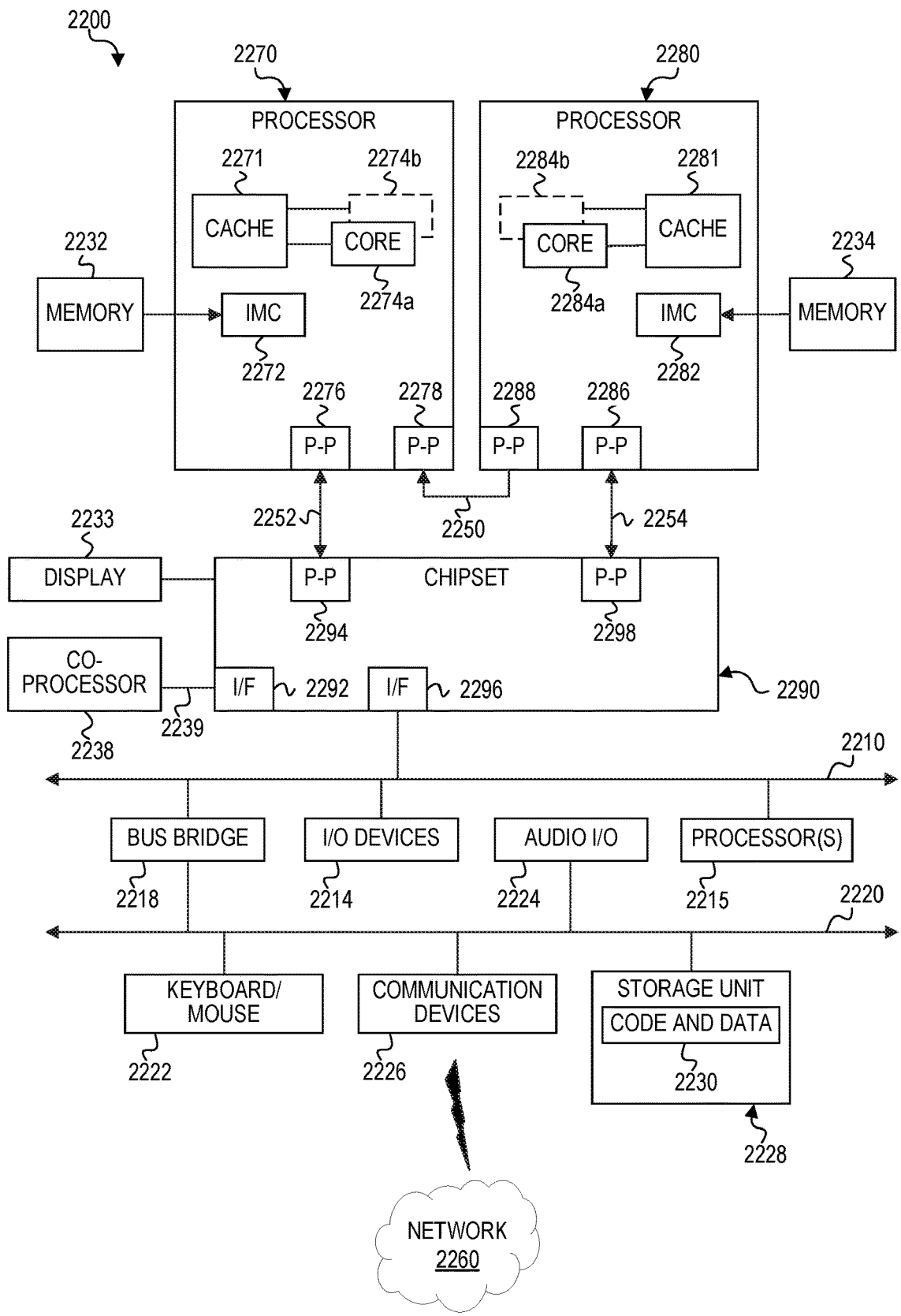
FIG. 22 is a block diagram of an example computer architecture according to at least one embodiment of the present disclosure.

FIG. 22 illustrates a computing system 2200 that is arranged in a point-to-point (PtP) configuration according to an embodiment. In particular, FIG. 22 shows a system where processors, memory, and input/output devices are interconnected by a number of point-to-point interfaces. Generally, one or more of the computing systems or computing devices, or portions thereof, described herein (e.g., system 600) may be at least partially configured in the same or similar manner as computing system 2200.

Processors 2270 and 2280 may be implemented as single core processors 2274a and 2284a or multi-core processors 2274a-2274b and 2284a-2284b. Processors 2270 and 2280 may each include a cache 2271 and 2281 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 2270 and 2280 may also each include integrated memory controller logic (MC) 2272 and 2282 to communicate with memory elements 2232 and 2234, which may be portions of main memory locally attached to the respective processors. In alternative embodiments, memory controller logic 2272 and 2282 may be discrete logic separate from processors 2270 and 2280. Memory elements 2232 and/or 2234 may store various data to be used by processors 2270 and 2280 in achieving operations and functionality outlined herein.

Processors 2270 and 2280 may be any type of processor, such as those discussed in connection with other figures. Processors 2270 and 2280 may exchange data via a point-to-point (PtP) interface 2250 using point-to-point interface circuits 2278 and 2288, respectively. Processors 2270 and 2280 may each exchange data with an input/output (I/O) subsystem 2290 via individual point-to-point interfaces 2252 and 2254 using point-to-point interface circuits 2276, 2286, 2294, and 2298. I/O subsystem 2290 may also exchange data with a high-performance graphics circuit 2238 via a high-performance graphics interface 2239, using an interface circuit 2292, which could be a PtP interface circuit. In one embodiment, the high-performance graphics circuit 2238 is a special-purpose processor, such as, for example, a high-throughput MIC processor, a network or communication processor, compression engine, graphics processor, GPU, embedded processor, or the like. I/O subsystem 2290 may also communicate with a display 2233 for displaying data that is viewable by a human user. In alternative embodiments, any or all of the PtP links illustrated in FIG. 22 could be implemented as a multi-drop bus rather than a PtP link.

I/O subsystem 2290 may be in communication with a bus 2220 via an interface circuit 2296. Bus 2220 may have one or more devices that communicate over it, such as a bus bridge 2218 and I/O devices 2216. Via a bus 2210, bus bridge 2218 may be in communication with other devices such as a user interface 2212 (such as a keyboard, mouse, touchscreen, or other input devices), communication devices 2226 (such as modems, network interface devices, or other types of communication devices that may communicate through a computer network 2260), audio I/O devices 2214, and/or a data storage device 2228. Data storage device 2228 may store code and data 2230, which may be executed by processors 2270 and/or 2280. In alternative embodiments, any portions of the bus architectures could be implemented with one or more PtP links.

The computer system depicted in FIG. 22 is a schematic illustration of an embodiment of a computing system that may be utilized to implement various embodiments discussed herein. It will be appreciated that various components of the system depicted in FIG. 22 may be combined in a system-on-a-chip (SoC) architecture or in any other suitable configuration capable of achieving the functionality and features of examples and implementations provided herein.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that one or more of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description but is not intended to be exhaustive or limited to the disclosure in the form disclosed. Many modifications and variations will be apparent to those of ordinary skill without departing from the scope and spirit of the disclosure. The embodiments are chosen and described in order to best explain the principles of the disclosure and the practical application, and to enable others of ordinary skill in the art to understand the disclosure for embodiments with various modifications as are suited to the particular use contemplated.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

OTHER NOTES AND EXAMPLES

The following examples pertain to embodiments in accordance with this specification. The system, apparatus, method, and machine readable storage medium embodiments can include one or a combination of the following examples:

Example A1 is an apparatus comprising: a processor core; and an interconnect interface coupled to the processor core to interconnect a peripheral device to the processor core via a link established between the peripheral device and the apparatus, where the interconnect interface is to: select a cryptographic engine of a plurality of cryptographic engines instantiated in the interconnect interface for the link, where the cryptographic engine is to symmetrically encrypt data to be transmitted through the link.

In Example A2, the subject matter of Example A1 can optionally include where each of the plurality of cryptographic engines is instantiated for one of: a request type on the link, a virtual channel on the link, or a request type within a virtual channel on the link.

In Example A3, the subject matter of any one of Examples A1-A2 can optionally include where the cryptographic engine is to use a key and a counter to perform counter mode encryption to symmetrically encrypt the data.

In Example A4, the subject matter of Example A3 can optionally include where the key matches one or more other keys associated with one or more other cryptographic engines of the plurality of cryptographic engines, and where the counter includes a number of most significant bits hardcoded to a unique value relative to a same number of most significant bits in one or more other counters associated with the one or more other cryptographic engines of the plurality of cryptographic engines.

In Example A5, the subject matter of Example A3 can optionally include where the key is unique relative to one or more other keys associated with one or more other cryptographic engines of the plurality of cryptographic engines.

In Example A6, the subject matter of any one of Examples A3-A5 can optionally include where the interconnect interface further includes an interconnect protocol stack to: generate a packet containing data encrypted by the cryptographic engine; and store, in the packet, a value derived from the counter.

In Example A7, the subject matter of Example A6 can optionally include where the value of the counter is stored in the packet based on a configurable packet frequency.

In Example A8, the subject matter of any one of Examples A6-A7, can optionally include where the value derived from the counter is based on one of a number of least significant bits in the counter or all of the bits in the counter.

In Example A9, the subject matter of any one of Examples A1-A8 can optionally include where the interconnect interface is a peripheral component interconnect express (PCIe) root complex.

In Example A10, the subject matter of any one of Examples A1-A9 can optionally include where the apparatus is a system-on-chip and the peripheral device is a solid state drive.

Example C1 is one or more non-transitory machine-readable storage media with instructions stored thereon, where the instructions are executable to cause a machine to: receive at an interconnect interface of a receiving device via a link attached to a sending device, first data and a value derived from a first counter associated with a first cryptographic engine of the sending device; and select a second cryptographic engine of a plurality of cryptographic engines instantiated on the interconnect interface for the link, where the second cryptographic engine is to perform one or more operations to symmetrically decrypt the first data.

In Example C2, the subject matter of C1 can optionally include where the second cryptographic engine is to be selected based on one of a request type associated with the first data, a virtual channel associated with the first data, or a request type within a virtual channel associated with the first data.

In Example C3, the subject matter of one or more Examples C1-C2 can optionally include where the value derived from the first counter is to be used to perform at least one of the one or more operations to decrypt the first data.

In Example C4, the subject matter of one or more Examples C1-C3 can optionally include where the value derived from the first counter is one of a number of least significant bits in the first counter or all of the bits in the first counter.

In Example C5, the subject matter of one or more Examples C1-C4 can optionally include where the second cryptographic engine is to: use the value derived from the first counter as an index in a table of precomputed encrypted streams to identify a precomputed encrypted stream for decrypting the first data; and use the precomputed encrypted stream in at least one of the one or more operations to decrypt the first data.

In Example C6, the subject matter of one or more Examples C1-C4 can optionally include where the second cryptographic engine is to: generate an encrypted stream based on the value derived from the first counter and a key associated with the second cryptographic engine; and use the encrypted stream in at least one of the one or more operations to decrypt the first data.

In Example C7, the subject matter of Example C6 can optionally include where the second cryptographic engine is to: determine whether a value derived from a second counter associated with the second cryptographic engine is out of sync with the value derived from the first counter associated with the first cryptographic engine, where the encrypted stream is to be generated based on determining the value derived from the second counter is out of sync with the value derived from the first counter.

Example S1 is a system comprising: a first interconnect interface coupled to a processor core, the first interconnect interface including a first cryptographic engine; and a second interconnect interface including a second cryptographic engine, where the first cryptographic engine is to: symmetrically encrypt first data to produce second data; and transmit the second data and a value derived from a first counter associated with the first cryptographic engine to the second interconnect interface via a link that connects the first interconnect interface with the second interconnect interface.

In Example S2, the subject matter of Examples S1 can optionally include where the first cryptographic engine is further to: generate a packet containing the second data; determine whether a packet frequency count has met or exceeded a threshold; and based on determining that the packet frequency count has met or exceeded a threshold, store in the packet the value derived from the first counter.

In Example S3, the subject matter of any one of Examples S1-S2 can optionally include where the second cryptographic engine is further to reset the link in response to determining that a value derived from a second counter associated with the second cryptographic engine is out of sync with the value derived from the first counter associated with the first cryptographic engine.

In Example S4, the subject matter of any one of Examples S1-A3 can optionally include where the first interconnect interface includes a third cryptographic engine, and where the second interconnect interface includes a fourth cryptographic engine connected to the third cryptographic engine via the link.

In Example S5, the subject matter of Examples S4 can optionally include where the first and second cryptographic engines are associated with a first virtual channel and a first request type, and where the third and fourth cryptographic engines are associated with a second virtual channel and the first request type.

In Example S6, the subject matter of Example S4 can optionally include where the first and second cryptographic engines are associated with a first virtual channel and a first request type, and where the third and fourth cryptographic engines are associated with the first virtual channel and a second request type.

Example M1 is a method comprising: receiving at an interconnect interface of a receiving device via a link attached to a sending device, first data and a value derived from a first counter associated with a first cryptographic engine of the sending device; and selecting a second cryptographic engine of a plurality of cryptographic engines instantiated on the interconnect interface for the link; and performing, by the second cryptographic engine, one or more operations to symmetrically decrypt the first data.

In Example M2, the subject matter of M1 can optionally include selecting the second cryptographic engine based on one of a request type associated with the first data, a virtual channel associated with the first data, or a request type within a virtual channel associated with the first data.

In Example M3, the subject matter of one or more Examples M1-M2 can optionally include where the value derived from the first counter is used to perform at least one of the one or more operations to decrypt the first data.

In Example M4, the subject matter of Examples M1-M3 can optionally include where the value derived from the first counter is one of a number of least significant bits in the first counter or all of the bits in the first counter.

In Example M5, the subject matter of one or more Examples M1-M4 can optionally include using the value derived from the first counter as an index in a table of precomputed encrypted streams to identify a precomputed encrypted stream for decrypting the first data; and using the precomputed encrypted stream in at least one of the one or more operations to decrypt the first data.

In Example M6, the subject matter of one or more Examples M1-M4 can optionally include generating an encrypted stream based on the value derived from the first counter and a key associated with the second cryptographic engine; and using the encrypted stream in at least one of the one or more operations to decrypt the first data.

In Example M7, the subject matter of Example M6 can optionally include determining whether a value derived from a second counter associated with the second cryptographic engine is out of sync with the value derived from the first counter associated with the first cryptographic engine, where the encrypted stream is generated based on determining the value derived from the second counter is out of sync with the value derived from the first counter.

An Example X1 provides an apparatus, the apparatus comprising means for performing the method of any one of the preceding Examples M1-M7.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the Examples M1-M7.

In Example X4, the subject matter of any one of Examples X1-X3 can optionally include that the apparatus is one of a computing system or a system-on-chip.

Example Y1 provides at least one machine readable storage medium comprising instructions, where the instructions when executed realize a system or an apparatus or implement a method in any one of the Examples S1-S6, A1-A10, or M1-M7.

The invention claimed is:

1. An apparatus, comprising:
   a processor core; and
      a first interconnect interface coupled to the processor core to interconnect a peripheral device to the processor core via a link established between the first interconnect interface and a second interconnect interface of the peripheral device, wherein the first interconnect interface is to:
   select a cryptographic engine of a first plurality of cryptographic engines instantiated in the first interconnect interface for the link, wherein the cryptographic engine is to symmetrically encrypt data to be transmitted through the link to a corresponding cryptographic engine of a second plurality of cryptographic engines instantiated in the second interconnect interface of the peripheral device.

2. The apparatus of claim 1, wherein each of the first plurality of cryptographic engines is instantiated for one of: a request type on the link, a virtual channel on the link, or a request type within a virtual channel on the link.

3. The apparatus of claim 1, wherein the cryptographic engine is to use a key and a counter to perform counter mode encryption to symmetrically encrypt the data.

4. The apparatus of claim 3, wherein the key matches one or more other keys associated with one or more other cryptographic engines of the first plurality of cryptographic engines, and wherein the counter includes a number of most significant bits hardcoded to a unique value relative to a same number of most significant bits in one or more other counters associated with the one or more other cryptographic engines of the first plurality of cryptographic engines.

5. The apparatus of claim 3, wherein the key is unique relative to one or more other keys associated with one or more other cryptographic engines of the first plurality of cryptographic engines.

6. The apparatus of claim 3, wherein the first interconnect interface further includes an interconnect protocol stack to:
   generate a packet containing data encrypted by the cryptographic engine; and
   store, in the packet, a value derived from the counter.

7. The apparatus of claim 6, wherein the value derived from the counter is stored in the packet based on a configurable packet frequency.

8. The apparatus of claim 6, wherein the value derived from the counter is based on one of a number of least significant bits in the counter or all bits in the counter.

9. The apparatus of claim 1, wherein the first interconnect interface is a peripheral component interconnect express (PCIe) root complex.

10. The apparatus of claim 1, wherein the apparatus is a system-on-chip and the peripheral device is a solid state drive.

11. One or more non-transitory machine-readable storage media with instructions stored thereon, wherein the instructions are executable to cause a machine to:
   receive at an interconnect interface of a receiving device via a link attached to a sending device, first data and a value derived from a first counter associated with a first cryptographic engine of a first plurality of cryptographic engines of the sending device; and
   select a second cryptographic engine of a second plurality of cryptographic engines instantiated on the interconnect interface for the link, wherein the second cryptographic engine is to perform one or more operations to symmetrically decrypt the first data based, at least in part, on the value.

12. The one or more non-transitory machine-readable storage media of claim 11, wherein the second cryptographic engine is to be selected based on one of a request type associated with the first data, a virtual channel associated with the first data, or a request type within a virtual channel associated with the first data.

13. The one or more non-transitory machine-readable storage media of claim 11, wherein the value derived from the first counter is to be used to perform at least one of the one or more operations to decrypt the first data.

14. The one or more non-transitory machine-readable storage media of claim 11, wherein the value derived from the first counter is one of a number of least significant bits in the first counter or all bits in the first counter.

15. The one or more non-transitory machine-readable storage media of claim 11, wherein the second cryptographic engine is to:
   use the value derived from the first counter as an index in a table of precomputed encrypted streams to identify a precomputed encrypted stream for decrypting the first data; and
   use the precomputed encrypted stream in at least one of the one or more operations to decrypt the first data.

16. The one or more non-transitory machine-readable storage media of claim 11, wherein the second cryptographic engine is to:
   generate an encrypted stream based on the value derived from the first counter and a key associated with the second cryptographic engine; and
   use the encrypted stream in at least one of the one or more operations to decrypt the first data.

17. The one or more non-transitory machine-readable storage media of claim 16, wherein the second cryptographic engine is to:
   determine whether a second value derived from a second counter associated with the second cryptographic engine is out of sync with the value derived from the first counter associated with the first cryptographic engine,
   wherein the encrypted stream is to be generated based on determining the second value derived from the second counter is out of sync with the value derived from the first counter.

18. A system comprising:
   a first interconnect interface coupled to a processor core, the first interconnect interface including a first cryptographic engine; and a second interconnect interface including a second cryptographic engine, wherein the first cryptographic engine is to:
  symmetrically encrypt first data to produce second data; and
  transmit the second data and a value derived from a first counter associated with the first cryptographic engine to the second interconnect interface via a link that connects the first interconnect interface with the second interconnect interface, wherein the second cryptographic engine is to:
  receive the second data from the first interconnect interface; and
  symmetrically decrypt the second data to produce the first data based, at least in part on the value.

19. The system of claim 18, wherein the first cryptographic engine is further to:
  generate a packet containing the second data;
  determine whether a packet frequency count has met or exceeded a threshold; and
  based on determining that the packet frequency count has met or exceeded the threshold, store in the packet the value derived from the first counter.

20. The system of claim 19, wherein the second cryptographic engine is further to:
  reset the link in response to determining that a second value derived from a second counter associated with the second cryptographic engine is out of sync with the value derived from the first counter associated with the first cryptographic engine.

21. The system of claim 18, wherein the first interconnect interface includes a third cryptographic engine, and wherein the second interconnect interface includes a fourth cryptographic engine connected to the second cryptographic engine via the link.

22. The system of claim 21, wherein the first and second cryptographic engines are associated with a first virtual channel and a first request type, and wherein the third and fourth cryptographic engines are associated with a second virtual channel and the first request type.

23. The system of claim 21, wherein the first and second cryptographic engines are associated with a first virtual channel and a first request type, and wherein the third and fourth cryptographic engines are associated with the first virtual channel and a second request type.

* * * * *